US008623154B2

(12) United States Patent
Honma et al.

(10) Patent No.: US 8,623,154 B2
(45) Date of Patent: Jan. 7, 2014

(54) ELECTRON-BEAM WELDED JOINT, STEEL FOR ELECTRON-BEAM WELDING, AND MANUFACTURING METHOD

(75) Inventors: Ryuichi Honma, Tokyo (JP); Ryuji Uemori, Tokyo (JP); Tadashi Ishikawa, Tokyo (JP); Akihiko Kojima, Tokyo (JP); Manabu Hoshino, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/988,737

(22) PCT Filed: Oct. 27, 2011

(86) PCT No.: PCT/JP2011/074776
§ 371 (c)(1),
(2), (4) Date: Jul. 10, 2013

(87) PCT Pub. No.: WO2012/070353
PCT Pub. Date: May 31, 2012

(65) Prior Publication Data
US 2013/0279971 A1    Oct. 24, 2013

(30) Foreign Application Priority Data

Nov. 22, 2010   (JP) ................. P2010-260485

(51) Int. Cl.
C22C 38/14 (2006.01)
C22C 38/04 (2006.01)
C21D 7/13 (2006.01)
B32B 15/01 (2006.01)

(52) U.S. Cl.
USPC ........... 148/328; 148/320; 148/546; 148/648; 420/126; 420/128; 420/110; 428/683; 219/146.23

(58) Field of Classification Search
USPC .......... 148/320, 328, 546, 648; 420/126, 128, 420/104–120, 90–93; 219/121.14, 146.23, 219/146.1; 428/683
See application file for complete search history.

(56) References Cited

U.S. PATENT DOCUMENTS 5,985,053 A * 11/1999 Hara et al. .................... 148/335
8,303,734 B2 * 11/2012 Yoshida et al. .............. 148/330
(Continued)

FOREIGN PATENT DOCUMENTS

JP    64-15321 A    1/1989
JP    1-150453 A    6/1989
(Continued)

OTHER PUBLICATIONS

International Search Report issued in PCT/JP2011/074776, mailed on Jan. 24, 2012.

*Primary Examiner* — Deborah Yee
(74) *Attorney, Agent, or Firm* — Birch, Stewart, Kolasch & Birch, LLP

(57) ABSTRACT

An electron-beam welded joint including, by mass %, C: 0.02% to 0.1%, Si: 0.03% to 0.30%, Mn: 1.5% to 2.5%, Ti: 0.005 to 0.015%, N: 0.0020 to 0.0060%, O: 0.0010% to 0.0035%, Nb: 0% to 0.020%, V: 0% to 0.030%, Cr: 0% to 0.50%, Mo: 0% to 0.50%, Cu: 0% to 0.25%, Ni: 0% to 0.50%, B: 0% to 0.0030%, S: limited to 0.010% or less, P: limited to 0.015% or less, Al: limited to 0.004% or less, and a balance consisting of iron and unavoidable impurities, wherein an index value CeEB is 0.49% to 0.60%, a number of oxides having an equivalent circle diameter of 1.0 μm or more is 20 pieces/mm² or less, and a number of oxides having an equivalent circle diameter of 0.05 μm or more and less than 0.5 μm is $1\times10^3$ pieces/mm² to $1\times10^5$ pieces/mm² at a thickness center portion.

7 Claims, 7 Drawing Sheets

(56) References Cited

U.S. PATENT DOCUMENTS

| | | | |
|---|---|---|---|
| 8,361,248 B2* | 1/2013 | Chijiiwa et al. | 148/332 |
| 2013/0189536 A1* | 7/2013 | Honma et al. | 428/576 |

FOREIGN PATENT DOCUMENTS

| | | |
|---|---|---|
| JP | 6-122943 A | 5/1994 |
| JP | 2006-37397 A | 2/2006 |
| JP | 2006-322400 A | 11/2006 |
| JP | 2007-21532 A | 2/2007 |
| JP | 2007-92406 A | 4/2007 |
| JP | 2008-88504 A | 4/2008 |
| JP | 2008-111406 A | 5/2008 |
| WO | WO 99/16101 A2 | 4/1999 |
| WO | WO 2006/009299 A1 | 1/2006 |

* cited by examiner

US 8,623,154 B2

ELECTRON-BEAM WELDED JOINT, STEEL FOR ELECTRON-BEAM WELDING, AND MANUFACTURING METHOD

TECHNICAL FIELD

The present invention relates to a steel for electron-beam welding, which is to be welded by emitting an electron-beam to a weld-target portion, and a method of manufacturing the steel for electron-beam welding, and further relates to an electron-beam welded joint formed by emitting an electron-beam to a weld-target portion of the steel.

The present application claims priority based on Japanese Patent Application No. 2010-260485 filed in Japan on Nov. 22, 2010, the disclosure of which is incorporated herein by reference.

BACKGROUND ART

In recent years, problems have arisen of reducing $CO_2$ gas, which is said to be a cause of global warming, or the future exhaustion of oil or other fossil fuels. To address these problems, recyclable natural energy has been actively used. Wind power is one form of promising recyclable natural energies, and large-scale wind power generators have been increasingly constructed.

The most suitable area for wind power generators to be constructed is an area where strong wind is expected to blow constantly. Thus, off-shore wind power generators are under planning or actually in operation all over the world (see Patent Documents 1 to 4).

In order to build a tower for wind power generation at sea, it is necessary to drive a foundation portion of the tower into the seabed. Further, in order to obtain sufficient height of turbine blades of the wind power generator from the sea level, a foundation portion of the tower is required to have sufficient length.

Thus, the foundation portion of the tower of the wind power generator employs a steel pipe structure having a wall thickness exceeding 50 mm, for example, of approximately 100 mm, and a large diameter in cross-section of approximately 4 m. Further, the total height of the tower is as high as 80 m or more. In recent years, a large steel-structure such as a tower for wind power generation has been required to be welded and built through electron-beam welding on the coast near the construction site in an easy and efficient manner.

In other words, under the circumstances described above, there arises a new technical demand for welding an ultra-thick steel plate having a thickness of 100 mm on-site in a highly efficient manner.

In general, a high-energy-density beam welding such as electron-beam welding and laser beam welding exhibits high efficiency. However, the thickness of the steel plate to be welded with laser beam has been limited. Further, the conventional electron-beam welding is required to be performed in a vacuum chamber under a high vacuum state. Thus, the thickness or size of the steel plate that can be welded through the high-energy-density beam welding largely depends on the capacity of welding equipment or the capacity of the vacuum chamber.

In recent years, to address the circumstances described above, an electron-beam welding method has been proposed that employs reduced pressure in the vicinity of a weld-target portion, thereby efficiently welding an ultra-thick steel plate with a thickness of approximately 100 mm on-site. For example, Welding Institute of the United Kingdom has developed a welding method (reduced pressured electron-beam welding: RPEBW) enabling working under a low vacuum state (see Patent Document 5).

With the method of RPEBW, it is possible to efficiently perform welding, by locally reducing the pressure of the portion to be welded to be a vacuum state in a case where a large-scale steel structure such as the tower of the wind power generator is constructed. The RPEBW method is a welding method that is performed in a state in which the degree of vacuum is low as compared with the method of performing welding in the vacuum chamber.

In general, a fracture toughness value $\delta_c$ based on fracture mechanics is known as an index for quantitatively evaluating the safety of a welded structure. The fracture toughness value $\delta_c$ can be obtained through a CTOD (crack tip opening displacement) test. The fracture toughness is affected by a size of a test piece. Thus, although favorable results can be obtained through a small-sized test such as the conventional V-notch Charpy impact test, it is not always true that the favorable fracture toughness value $\delta_c$ can be obtained through the CTOD test with a welded joint in the large-scale steel structure.

The electron-beam welding method is a method employing energy of the electron-beam to once melt and solidify the base metal of a welded portion to weld. Normally, the compositions of the molten metal portion in the electron-beam welding method are almost the same as those of the base metal (steel). On the other hand, in large-heat input arc welding such as electro gas welding, mechanical properties such as hardness and the fracture toughness value $\delta_c$ of the welded metal is adjusted by using, for example, welding wire. It is difficult to use such a method in the electron-beam welding method.

In view of the above-described circumstances, a method of optimizing the hardness or cleanliness of the welded metal (WM) has been proposed to improve the fracture toughness value $\delta_c$ of the electron-beam welded joint (see, for example, Patent Documents 6 and 7). Patent Document 6 proposes setting the hardness of the welded metal to be more than 110% and not more than 220% of that of the base metal, and setting the width of the welded metal to be 20% or less of the thickness of the steel. Further, Patent Document 7 proposes setting the amount of O in the welded metal to 20 ppm or more, and the number of oxides having a diameter of 2.0 μm or more to 10 pieces/mm² or less.

RELATED ART DOCUMENTS

Patent Documents

Patent Document 1: Japanese Unexamined Patent Application, First Publication No. 2008-111406
Patent Document 2: Japanese Unexamined Patent Application, First Publication No. 2007-092406
Patent Document 3: Japanese Unexamined Patent Application, First Publication No. 2006-322400
Patent Document 4: Japanese Unexamined Patent Application, First Publication No. 2006-037397
Patent Document 5: PCT International Publication No. WO 99/16101
Patent Document 6: Japanese Unexamined Patent Application, First Publication No. 2007-21532
Patent Document 7: Japanese Unexamined Patent Application, First Publication No. 2008-88504

DISCLOSURE OF INVENTION

Problems to be Solved by Invention

When a tower of a wind power generator at sea is constructed, steels are butted to each other to weld, and the welded steels are used without applying any thermal treatment to the welded portion. Thus, a welded metal (WM) and a weld heat-affected zone (HAZ: heat-affected zone, hereinafter, referred to simply as "heat-affected zone") are required to have excellent toughness. In the case of the electron-beam welding, since the welding wire is not usually used, the toughnesses of the welded metal and the heat-affected zone are controlled by adjusting the composition of base metal.

Conventionally, a method of controlling inclusions in the welded metal, a relationship between the hardness of the welded metal and the hardness of the base metal, or the width of the welded metal is proposed. However, in the case where the toughness of the heat-affected zone is not sufficient, the fracture toughness of the welded joint portion as a whole reduces.

It should be noted that, by attaching a plate-like or foil-like Ni foil (insert metal) or the like to a welded surface (groove face), and applying electron-beam welding, it is possible to enhance the toughness of the welded metal (WM) so as to be higher than that of the base metal. However, in this case, the difference in hardness between the welded metal and the heat-affected zone significantly increases if the compositions of the base metal are not appropriate. This leads to a significant reduction in the fracture toughness value $\delta_c$ of the heat-affected zone where the difference in hardness is significantly large.

According to the study made by the present inventors, in the electron-beam welded joint, even if the insert metal is not used, the appropriate compositions for improving the toughness are not always the same between the welded metal and the heat-affected zone (base metal). Thus, the high toughness cannot be obtained at the welded metal even if the electron-beam welding is applied to the conventional high-HAZ-toughness steel for arc welding. Further, the high toughness cannot be obtained at the heat-affected zone even if the compositions of the steel for arc welding are optimized by taking the toughness of the welded metal formed by the electron-beam welding into consideration.

In other words, the electron-beam welding and the arc welding are fundamentally different in the welding method and the formed joint structure. Thus, the problem of the electron-beam welding cannot be solved by using the manner for solving the problem of the arc welding.

The present invention has been made in view of the circumstances described above, and an object of the present invention is to provide a steel for electron-beam welding having a thickness of 45 mm or more and constituting a foundation portion of a tower of a wind power generator at sea, which can be used for forming a welded joint exhibiting increased strength and appropriate balance of the fracture toughness between the welded metal (WM), the heat-affected zone (HAZ) and the base metal (BM), and a method of manufacturing the steel for electron-beam welding. The other object of the present invention is to provide an electron-beam welded joint having excellent fracture toughness, which is formed by emitting an electron-beam to a weld-target portion.

Solution to Problems

According to the present invention, to solve the above problems, Mn of 1.5 mass % or more is added to secure hardenability, and an amount of Al which is a deoxidation element is decreased as much as possible while Ti is added to precipitate fine oxide particles containing Ti of 10% or more (hereinafter, referred to simply as oxides containing Ti). The oxides containing Ti are used as pinning particles for suppressing grain growth and nuclei for intra-granular transformation, and to make fracture toughnesses of steel (BM), heat-affected zone (HAZ), and welded metal (WM) appropriately balanced.

In particular, with the electron-beam welding, in which the WM width and the HAZ width are narrow and the amount of heat inputted is low, oxides containing Ti are quite useful as nuclei for the intra-granular transformation of the welded metal (WM) and the heat-affected zone (HAZ) and dominantly contribute to suppress coarsening of the microstructure.

Further, according to the present invention, by controlling a newly introduced index CeEB of hardenability after electron-beam welding, the fracture toughnesses of the steel (BM), the welded metal (WM), and the heat-affected zone (HAZ) are appropriately balanced to secure a desired fracture toughness at the welded portion as a whole. Yet further, according to the present invention, the amount of Mn is increased in order to enhance the hardenability, and the amounts of Cr, Mo, Cu, Ni, and/or Nb are decreased in order to reduce the manufacturing cost of the steel for electron-beam welding.

The index CeEB of hardenability after electron-beam welding is index newly introduced by the present inventors to improve the fracture toughness of the electron-beam welded joint. The technical meaning of the index CeEB will be described later.

An aspect of the present invention employs the following.

(1) An electron-beam welded joint according to an aspect of the invention is an electron-beam welded joint obtained by applying an electron-beam welding to a steel, the steel including as a composition, by mass %, C, 0.02% to 0.10%, Si: 0.03% to 0.30%, Mn: 1.5% to 2.5%, Ti: 0.005% to 0.015%, N, 0.0020% to 0.0060%, O: 0.0010% to 0.0035% Nb: 0% to 0.020%, V: 0% to 0.030%, Cr: 0% to 0.50%, Mo: 0% to 0.50%, Cu: 0% to 0.25%, Ni: 0% to 0.50%, B: 0% to 0.0030%, S: limited to 0.010% or less, P: limited to 0.015% or less, Al: limited to 0.004% or less, and a balance consisting of iron and unavoidable impurities, wherein an index value CeEB defined by a following Formula 1 is 0.49% to 060%, a number of oxides having an equivalent circle diameter of 1.0 µm or more is 20 pieces/mm² or less at a thickness center portion in a cross-section along a thickness direction of the steel, and a number of oxides containing Ti of 10% or more and having an equivalent circle diameter of 0.05 µm or more and less than 0.5 µm is $1\times10^3$ pieces/mm² to $1\times10^5$ pieces/mm² at the thickness center portion, the index value of hardenability after electron-beam welding, CeEB=C+9/40Mn+1/15Cu+1/15Ni+1/5Cr+1/5Mo+1/5V     (Formula 1)

where C, Mn, Cu, Ni, Cr, Mo and V represent amounts in mass % of each element contained in the composition of the steel.

(2) In the electron-beam welded joint according to the above (1), a C/CeEB, which is a ratio of an amount in mass % of C in the steel relative to the index value CeEB of the steel, may be 0.04 to 0.18.

(3) In the electron-beam welded joint according to the above (1) or (2), the steel may have a thickness of 45 to 150 mm.

(4) In the electron-beam welded joint according to any one of the above (1) to (3), when a CTOD value of the welded metal is defined as $\delta_{WM}$, a CTOD value of a weld heat-affected zone is defined as $\delta_{HAZ}$, and a CTOD value of the steel is defined as $\delta_{BM}$, $0.5 \leq \delta_{WM}/\delta_{BM} \leq 1.1$, and $0.5 \leq \delta_{HAZ}/\delta_{BM} \leq 1.1$ may be satisfied.

(5) A steel for electron-beam welding according to another aspect of the invention is a steel for an electron-beam welding, the steel including as a composition, by mass %, C, 0.02% to 0.10%, Si: 0.03% to 0.30%, Mn: 1.5% to 2.5%, Ti: 0.005% to 0.015%, N, 0.0020% to 0.0060%, O: 0.0010% to 0.0035%, Nb: 0% to 0.020%, V: 0% to 0.030%, Cr: 0% to 0.50%, Mo: 0% to 0.50%, Cu: 0% to 0.25%, Ni: 0% to 0.50%, B: 0% to 0.0030%, S: limited to 0.010% or less, P: limited to 0.015% or less, Al: limited to 0.004% or less, and a balance consisting of iron and unavoidable impurities, wherein an index value CeEB obtained by substituting the composition of the steel into a following Formula 1 is 0.49% to 0.60%, a number of oxides having an equivalent circle diameter of 1.0 µm or more is 20 pieces/mm$^2$ or less at a thickness center portion in a cross-section along a thickness direction of the steel, and a number of oxides containing Ti of 10% or more and having an equivalent circle diameter of 0.05 µm or more and less than 0.5 µm is $1 \times 10^3$ pieces/mm$^2$ to $1 \times 10^5$ pieces/mm$^2$ at the thickness center portion, the index value of hardenability after electron-beam welding, CeEB=C+9/40Mn+1/15Cu+1/15Ni+1/5Cr+1/5Mo+1/5V    (Formula 1)

where C, Mn, Cu, Ni, Cr, Mo, and V represent amounts in mass % of each element contained in the composition of the steel.

(6) In the steel for electron-beam welding according to the above (5), a C/CeEB, which is a ratio of an amount in mass % of C in the steel relative to the index value CeEB of the steel, may be 0.04 to 0.18.

(7) In the steel for electron-beam welding according to the above (5) or (6), the steel may have a thickness of 45 to 150 mm.

(8) A manufacturing method according to the other aspect of the invention is a method of manufacturing the steel for the electron-beam welding according to any one of the above (5) to (7), the method including, a casting process of casting and cooling the steel so that a cooling rate in a temperature range of 1300° C. to 1100° C. is 9° C./min or more, and a process of heating the steel to a temperature range of 950° C. to 1150° C. after the casting process, and thereafter thermomechanical-treating the steel.

In order to secure a predetermined CTOD value (fracture toughness value) in the electron-beam welded joint, it is important to appropriately balance the fracture toughness values of the steel (BM), the welded metal (WM), and the heat-affected zone (HAZ).

In other words, even if the fracture toughness of the steel (base metal) and the fracture toughness of the heat-affected zone are excellent, the welded metal acts as the starting point of fracture when the fracture toughness of the welded metal is insufficient. Even if the fracture toughness of the welded metal is excellent, the heat-affected zone acts as the starting point and the fracture propagates when the fracture toughness of the heat-affected zone is insufficient. As described above, when the fracture toughness is uneven at portions of the welded joint, the fracture toughness of the welded joint as a whole deteriorates.

In the welded portion (the welded metal and the heat-affected zone) of the steel which has a yield strength of 355 MPa grade and to which the electron-beam welding is applied, brittle fracture occurs from coarse ferrite at grain boundary formed from the prior austenite grain, upper bainite, ferrite side plate, and the like.

A unit of fracture surface at the time when the brittle fracture occurs from the above microstructure is dependent upon the grain diameter of the prior austenite. Thus, the fracture toughness of the welded portion can be improved by reducing the grain diameter of the microstructure in the welded metal and the heat-affected zone by using the pinning effect of precipitates or intra-granular transformation.

On the basis of the facts described above, in accordance with a fundamental thought of the present invention, an amount of Al is decreased and Ti is added so that an appropriate amount of oxides containing Ti having appropriate grain diameter in the welded metal (WM) and the heat-affected zone (HAZ) of the welded portion. The fine oxides containing Ti function as pinning particles that suppress the grain growth and act as nuclei for intra-granular transformation. As a result, intra-granular ferrite is formed in the heat-affected zone. The oxides containing Ti are oxides containing 10% or more of Ti, for example, TiO or $Ti_2O_3$. The oxides containing Ti may include elements excepting Ti and O.

As a result, the structure of the welded metal and the heat-affected zone is refined, and the fracture toughnesses of the steel (base metal), the heat-affected zone, and the welded metal improve while the balance between these three fracture toughnesses improves.

Advantageous Effects of Invention

According to the present invention, it is possible to suppress the deterioration in the fracture toughnesses of a welded metal and a heat-affected zone of an electron-beam welded joint of a steel with a yield strength of 355 MPa grade. Further, it is possible to provide an electron-beam welded joint in which the fracture toughnesses of the steel (base metal), the heat-affected zone and the welded metal are appropriately balanced, and to provide the steel used for forming the welded joint at a low cost.

DESCRIPTION OF EMBODIMENTS

When the tower of a wind power generator is constructed at sea, the steel after being welded is used as it is without applying any thermal treatment to the joint portion. Thus, the welded metal and the heat-affected zone are required to have excellent toughness. In a case of electron-beam welding, since a welding wire is not generally used, toughnesses of a welded metal and a heat-affected zone are controlled by adjusting a composition of a base metal.

Figure 1:
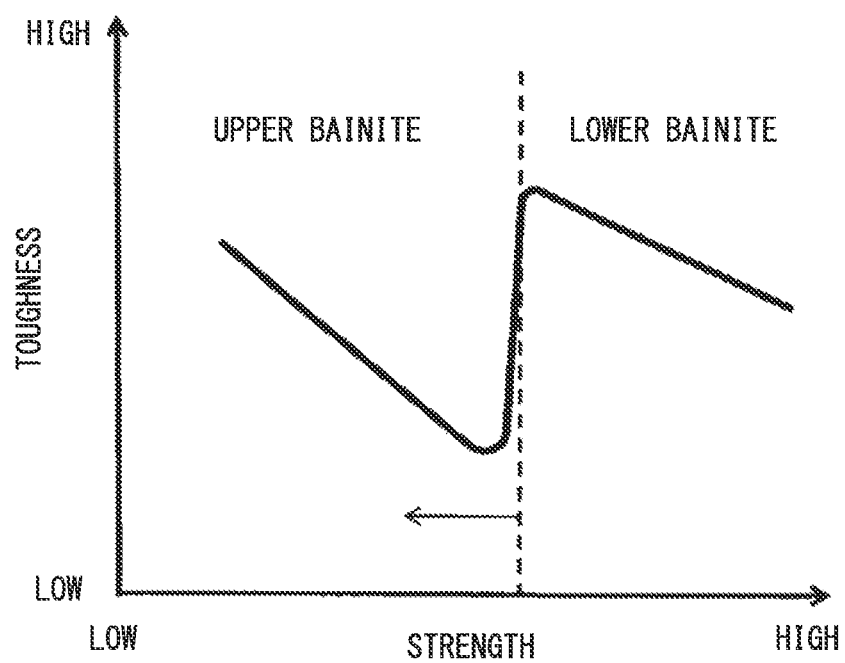
FIG. 1 is a diagram qualitatively illustrating a relationship between strength, toughness and a microstructure of a steel.

Conventionally, the electron-beam welding has been used, for example, for a steel containing a large amount of Cr or Mo (so-called Cr—Mo steel), a stainless steel, or high-Ni steel, to which formation of oxides of the welded metal is not necessary. In a case of the stainless steel, a brittle phase is not formed in the heat-affected zone. Further, in the case of Cr—Mo steel, the structure of the heat-affected zone is made of lower bainite having excellent toughness as qualitatively illustrated in FIG. 1, and an extremely high toughness can be obtained.

The thickness and the strength of the steel used for the electron-beam welded joint according to the embodiment of the present invention are not particularly limited. However, it is preferable to use, for example, a steel for a structure used, for example, for the tower of a wind power generator at sea and having a thickness in the range of 45 mm to 150 mm, YP (yield point) in the range of approximately 315 MPa to 550 MPa, and TS (tensile strength) in the range of approximately 450 MPa to 690 MPa. Depending on application, the upper limit of the thickness may be set to 120 mm or 130 mm. The lower limit of YP may be set to 340 MPa or 355 MPa, and the upper limit of YP may be set to 500 MPa, 460 MPa, or 420 MPa. The lower limit of TS may be set to 470 MPa or 490 MPa, and the upper limit of TS may be set to 600 MPa, 570 MPa, or 550 MPa. This type of steel has strength lower than that of the Cr—Mo high-strength steel. Further, the structure of the heat-affected zone is an upper bainite having reduced toughness as qualitatively illustrated in FIG. 1. When this steel is subjected to the electron-beam welding, a coarsened structure such as ferrite at grain boundary or upper part bainite develops particularly in the heat-affected zone, and the high-carbon martensite (also referred to as island martensite or M-A constituent) is likely to be formed. Thus, in the case where the electron-beam welding is applied to the steel for a structure, it is not easy to secure the toughness of the heat-affected zone.

Figure 2A:
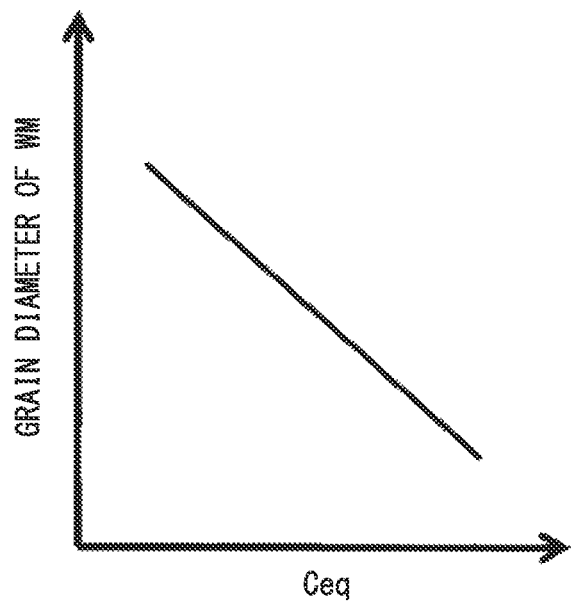
FIG. 2A is a diagram qualitatively illustrating a relationship between hardenability and crystal grain diameter of a welded metal.
Figure 2B:
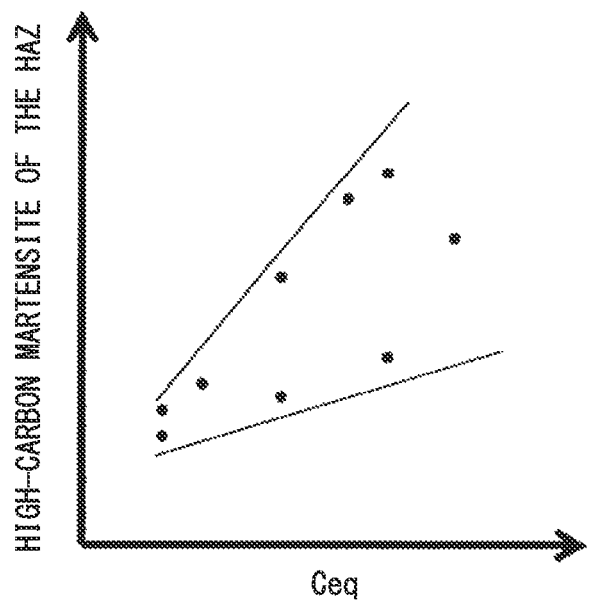
FIG. 2B is a diagram qualitatively illustrating a relationship between hardenability and the amount of high-carbon martensite in a heat-affected zone.

As for the relationship between the structure and the toughness, it is known that a reduction in the crystal grain diameter is particularly effective in improving the toughness of the welded metal, and the high-carbon martensite reduces the toughness particularly of the heat-affected zone. Further, as for the relationship between the composition and the structure, it is known that, by increasing the hardenability index Ceq, the grain diameter of the welded metal reduces as illustrated in FIG. 2A, and the high-carbon martensite of the heat-affected zone increases as illustrated in FIG. 2B.

Figure 3:
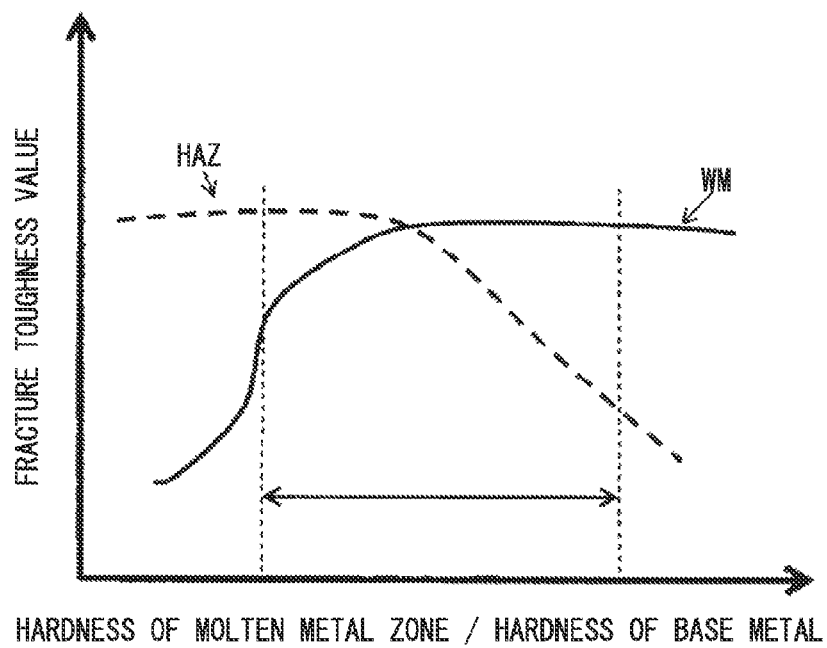
FIG. 3 is a diagram qualitatively illustrating a relationship between a ratio of hardness of the welded metal relative to hardness of the steel (base metal) and a fracture toughnesses of the welded metal and the heat-affected zone.

Further, in order to enhance the toughness of the welded metal and the heat-affected zone, the balance between the hardness of the welded metal and the hardness of the steel (base metal) is important. In other words, as illustrated in FIG. 3, the toughness of the welded metal improves with the increase in the hardness of the welded metal relative to the hardness of the steel (base metal). However, a deformation concentrates on the heat-affected zone due to the effect of the increase in the hardness of the welded metal, which results in a decrease in the toughness of the heat-affected zone. For these reasons, if the hardenability is increased to prevent formation of the upper bainite having less toughness, the welded metal hardens, which causes a problem of deterioration in the toughness of the heat-affected zone.

As described above, the relationship between the hardenability of the steel and the crystal grain diameter of the WM or high-carbon martensite of the HAZ, and the relationship between the ratio of the hardness of the WM relative to the hardness of the steel (base metal) and the toughness of the welded joint are qualitatively known. However, conventionally, the idea of controlling the balance of the fracture toughness of the welded joint with the composition of the steel has not been conceived. Thus, for example, in the case where the electron-beam welding is applied to the steel (base metal) having enhanced hardenability, a problem of significantly deteriorating the toughness of the HAZ occurs although the toughness of the WM improves.

In view of the facts described above, the present inventors made a study of an index indicating the hardenability suitable for the electron-beam welding in order to secure a desired toughness in the electron-beam welded joint, and found and newly introduced "CeEB". More specifically, the "index value of hardenability after electron-beam welding, CeEB" given by the following Formula 1 is a new index which are obtained by focusing the hardenability that largely affects the formation of the structure of the steel and by considering the formation of a desired structure reliably in order to further enhance the fracture toughness of the electron-beam welded joint.

$$CeEB = C + 9/40 Mn + 1/15 Cu + 1/15 Ni + 1/5 Cr + 1/5 Mo + 1/5 V \quad \text{(Formula 1)}$$

where C, Mn, Cu, Ni, Cr, Mo, and V represent amounts (mass %) of each element contained in the composition of the base metal of the electron-beam welding joint, i.e. the steel used for the electron-beam welding joint.

CeEB defined by the Formula 1 is an index which is obtained on the basis of the known carbon equivalent Ceq ($=C+1/6Mn+1/15Cu+1/15Ni+1/5Cr+1/5Mo+1/5V$) and in consideration that the hardenability decreases with a decrease in the amount of Mn due to evaporation at the time of electron-beam welding. It should be noted that a coefficient relating to Mn is set to 9/40 on the basis of the degree of the decrease in the hardenability, which is experimentally obtained.

The index value CeEB is an index for: (1) securing the hardenability within a desired range in the steel (base metal) before the electron-beam welding; (2) promoting formation of fine ferrite in the welded metal; and (3) suppressing formation of the upper bainite or high-carbon martensite that reduce the toughness in the heat-affected zone.

Figure 4:
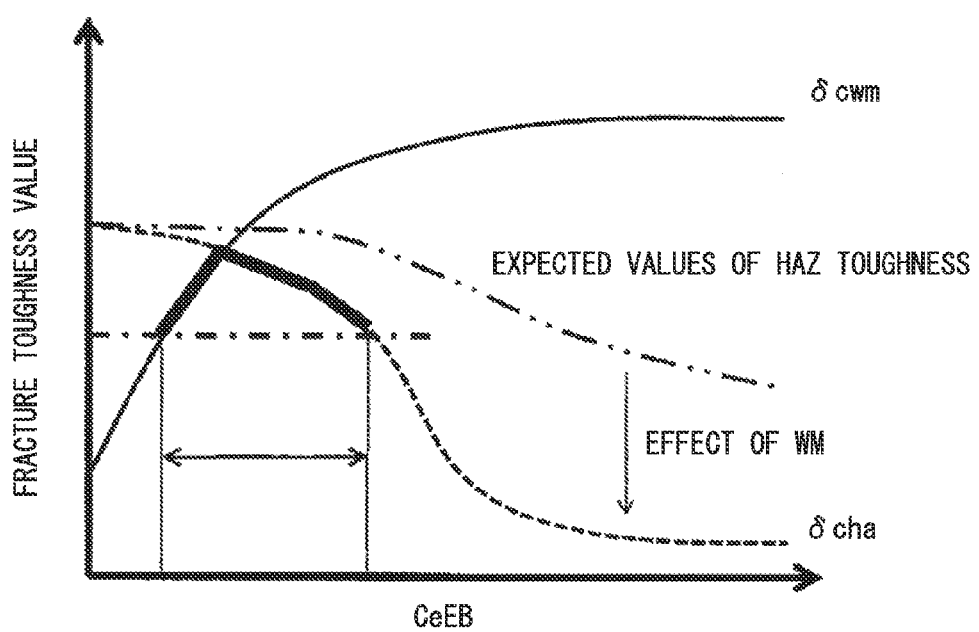
FIG. 4 is a diagram qualitatively illustrating a relationship between CeEB and a fracture toughness value ($\delta_c$) of the welded metal and the heat-affected zone.

FIG. 4 qualitatively illustrates the relationship between the fracture toughness values ($\delta_c$) of the welded metal (WM) and the heat-affected zone (HAZ) in the electron-beam welded joint, and CeEB. The solid line represents the fracture toughness value ($\delta_{cwm}$) of the welded metal, and the broken line represents the fracture toughness value ($\delta_{cha}$) of the heat-affected zone. The long dashed double-short dashed line represents the fracture toughness value of the heat-affected zone (expected values of HAZ toughness) on the assumption that the effect of the hardness of the WM is ignored. The expected values of the HAZ toughness can be measured, for example, through a fracture toughness test using a test piece subjected to a thermal treatment simulating a thermal history of the HAZ.

When the index value CeEB increases, $\delta_{cwm}$ increases due to the refinement of the structure in the WM. Contrary, in the HAZ, the expected value of the HAZ toughness decreases due to the increase in the high-carbon martensite and the hardening of the HAZ. Further, with the increase in the CeEB, the WM hardens, which results in a reduction in the $\delta_{cha}$ to be lower than the expected value of the HAZ toughness.

As described above, with the index CeEB, it is possible to comprehensively adjust the fracture toughnesses of the welded metal and the heat-affected zone. By setting the CeEB in an appropriate range, it is possible to make both of the fracture toughness values of the welded metal and the heat-affected zone more than or equal to the target value plotted with the dot-and-dash line. In the case where the pinning particles or intra-granular transformation described later are employed, the $\delta_{cwm}$ and $\delta_{cha}$ improve due to the effect of the pinning or intra-granular transformation.

Next, the present inventors made a study of a relationship between the amount of C and the CeEB in the steel (base metal), and the toughnesses of the base metal, the welded metal, and the heat-affected zone. As a result, it was found that it was preferable to adjust "C/CeEB" which is a ratio of the amount of C relative to CeEB of the base metal to a predetermined range. The technical meaning of the ratio "C/CeEB" will be described below.

Figure 5A:
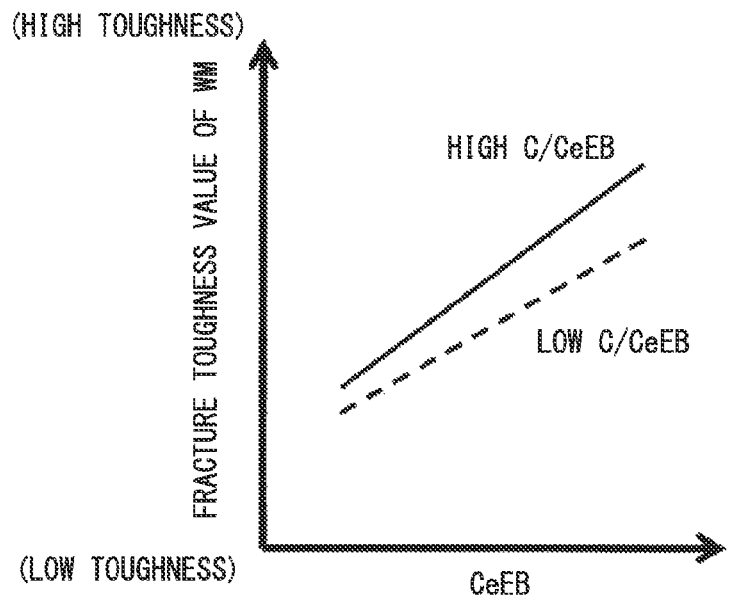
FIG. 5A is a diagram qualitatively illustrating a relationship between the fracture toughness value of the welded metal and C/CeEB.

The ratio "C/CeEB" is an index used for preventing the hardenability of the welded metal portion and the hardenability of the heat-affected zone from being undesirably unbalanced. FIG. 5A illustrates a relationship between CeEB and the fracture toughness value of the welded metal and FIG. 5B illustrates a relationship between CeEB and the fracture toughness value of the heat-affected zone.

The CeEB is an index relating to the hardenability. With the increase in CeEB, the fracture toughness value of the welded metal increases due to the refinement of the grain diameter, and the fracture toughness value of the heat-affected zone decreases due to the promotion of the formation of the high-carbon martensite. Moreover, during the electron-beam welding, some of Mn included in the welded metal evaporates, and the amount of Mn decreases.

Figure 5B:
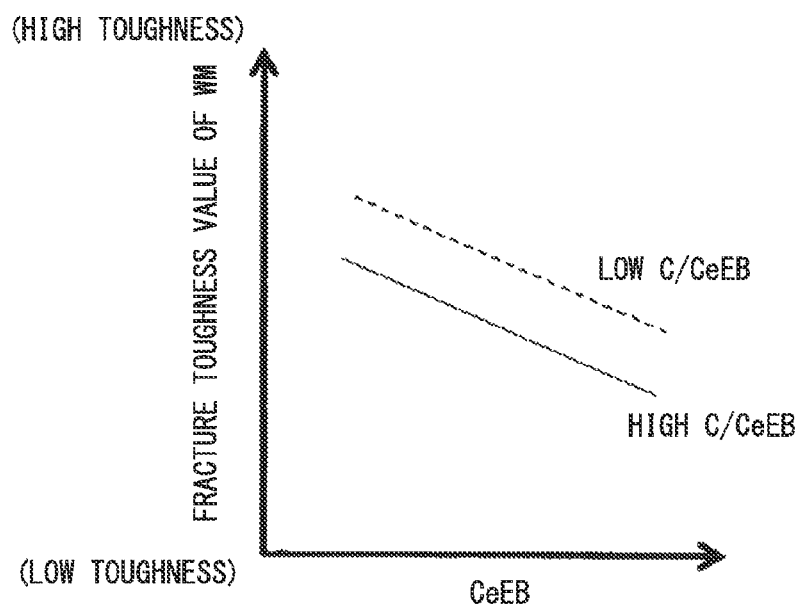
FIG. 5B is a diagram qualitatively illustrating a relationship between the fracture toughness value of the heat-affected zone and C/CeEB.

Thus, as shown in FIG. 5, in order to secure the fracture toughness value of the welded metal, it is preferable to ensure the hardenability by increasing the C/CeEB. On the other hand, in the heat-affected zone, the formation of the high-carbon martensite is promoted with the increase in the amount of C. Thus, as shown in FIG. 5B, in order to secure the fracture toughness value, it is preferable to limit the C/CeEB.

The present inventors further made a study of a method of improving the balance between the fracture toughness value of the welded metal and the fracture toughness value of the heat-affected zone. As a result, it was found that the grain growth in the heat-affected zone is suppressed and it was possible to improve the toughness of the heat-affected zone and the welded metal in the case where oxides containing Ti act as the pinning particle. Moreover, it was found that it was possible to improve the fracture toughness of the heat-affected zone and the welded metal by forming intra-granular ferrite using the oxides containing Ti which act as nuclei for intra-granular transformation.

Furthermore, the present inventors carried out preliminary tests in order to verify the influence of the size or number of oxide particles in steel including oxides containing Ti on the fracture toughness value of the electron-beam-welded joint. As described below in detail, in the preliminary tests, plural steels having the oxide particles of different numbers or sizes were produced by changing the total amount of oxygen in the steel or the cooling rate of slabs. Electron-beam welded joints were manufactured using the above steels, and the fracture toughness values were investigated.

In the preliminary tests, the oxide particles and the fracture toughness value were measured in thickness center portion along thickness direction of steel plate. The reasons are as follows. The first reason is that, at the thickness center portion, restraint intensity is mechanically highest and the fracture may be initiated, as confirmed in CTOD test in the electron-beam-welded joint. Moreover, in the thickness center portion of the steel plate, solute elements are concentrated and the structure is likely to be hardened due to solidification segregation (center segregation) during continuous casting. Thus, the second reason is that, at the thickness center portion, brittle fracture may easily occur metallurgically as compared to a portion near surface layer along the thickness direction. Furthermore, in the electron-beam-welded joint which is the target of the invention and which is different from a general arc-welded joint, fused face is planar and roughly parallel with the thickness direction, so that coarse oxide particles act as the starting point of the brittle fracture due to the above mentioned mechanical and metallurgical influence in the thickness direction. Thus, the third reason is that the fracture toughness values of the heat-affected zone and the welded metal of the electron-beam-welded joint may be influenced significantly by the size or number of the oxide particles which exist in the thickness center portion as compared to the general arc-welded joint.

As a result of investigating the relationship between the number of the oxide particles and the fracture toughness value through the preliminary tests described below, the following findings are obtained. In the case where an equivalent circle diameter of the oxide particles is 0.05 μm or more, the oxide particles containing Ti of 10% or more indicate the pinning effect and the intra-granular transformation promoting effect with high efficiency, and contribute significantly to the grain refinement. On the other hand, oxide particles having a relatively large grain diameter (all of the oxides including oxides containing Ti) act as the starting point of the brittle fracture. Since the inclusion particles tend to act as the starting point of the brittle fracture when the equivalent circle diameter of the inclusion particles is more than 0.5 μM and tend notably to act as the starting point of fracture in particular when the equivalent circle diameter is 1.0 μm or more, it is preferable that the number thereof is limited as low as possible. In addition, it was found that the grain refinement could be effectively achieved without causing the brittle fracture when an appropriate amount of the oxide particles containing Ti and having an equivalent circle diameter of 0.05 μm or more and less than 0.5 μm was contained in the steel.

In the preliminary tests, among oxide particles in the steel, the numbers were measured for two classes of (1) oxide particles containing Ti of 10% or more and having the equivalent circle diameter of 0.05 μm or more and less than 0.5 μm (hereinafter, also referred to simply as "fine oxides containing Ti") and (2) all of oxides having the equivalent circle diameter of 1.0 μm or more (hereinafter, also referred to simply as "coarse oxides"). The relationship between the numbers of oxide particles of the respective classes in the steel and the toughness value of the joint after electron-beam welding using the steel was quantitatively confirmed.

In the preliminary tests, slabs which intend to include, by mass %, C, 0.07%, Si: 0.06%, Mn: 2.0%, P: 0.007%, S: 0.002%, Ti: 0.009%, Al: 0.002%, and N: 0.006% were manufactured using a laboratory-scale furnace. When manufacturing the slabs, the following two processes were controlled in order to control the numbers of oxides of the respective classes. (i) The total amount of oxygen of the slab was adjusted by changing a treatment time of vacuum degassing of molten steel. (ii) During casting, the cooling rate of the slab in a temperature range of 1300° C. to 1100° C. was controlled to a range of 1° C./min to 30° C./min by adjusting a cooling water flow for cooling the slab. The compositions of the respective slabs manufactured in the preliminary tests approximately coincided with the target value of the above composition. In addition, the total amounts of oxygen of the respective manufactured slabs were 10 ppm to 41 ppm. Steel plates having a plate thickness of 50 mm were manufactured through ACC described below using the obtained slabs.

The number of oxide particles in the steels described above was measured through the method used in Examples described later.

Figure 7:
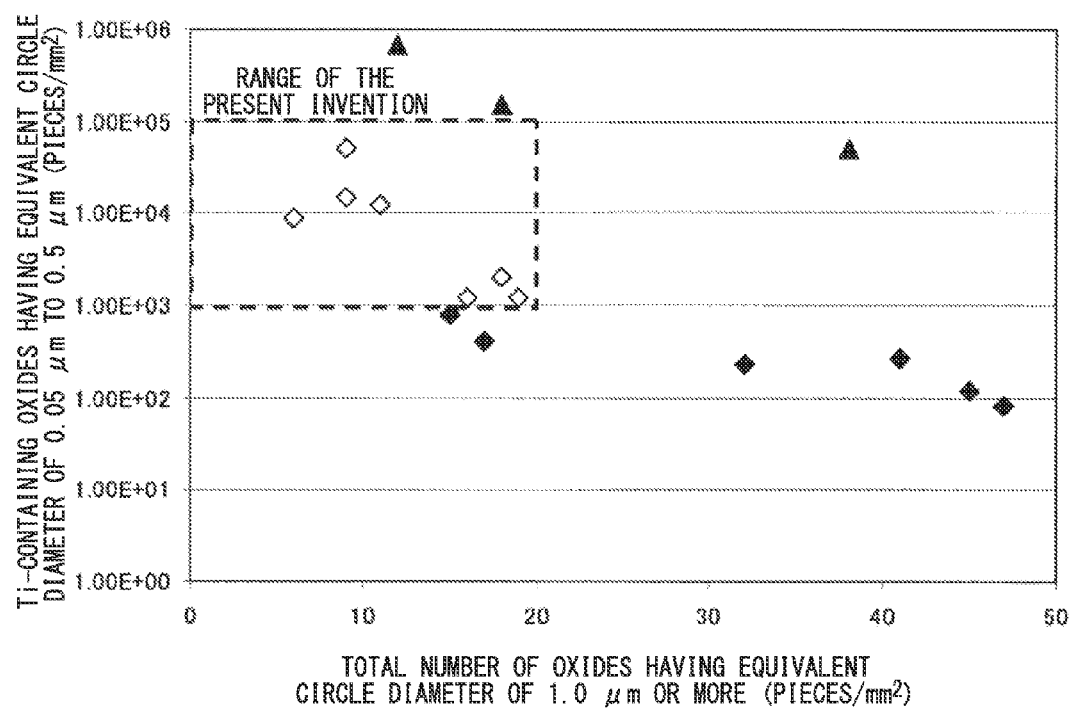
FIG. 7 is a diagram illustrating a relationship between results of a CTOD test applied to the welded joint and the number of oxides contained in the steel.
Figure 8A:
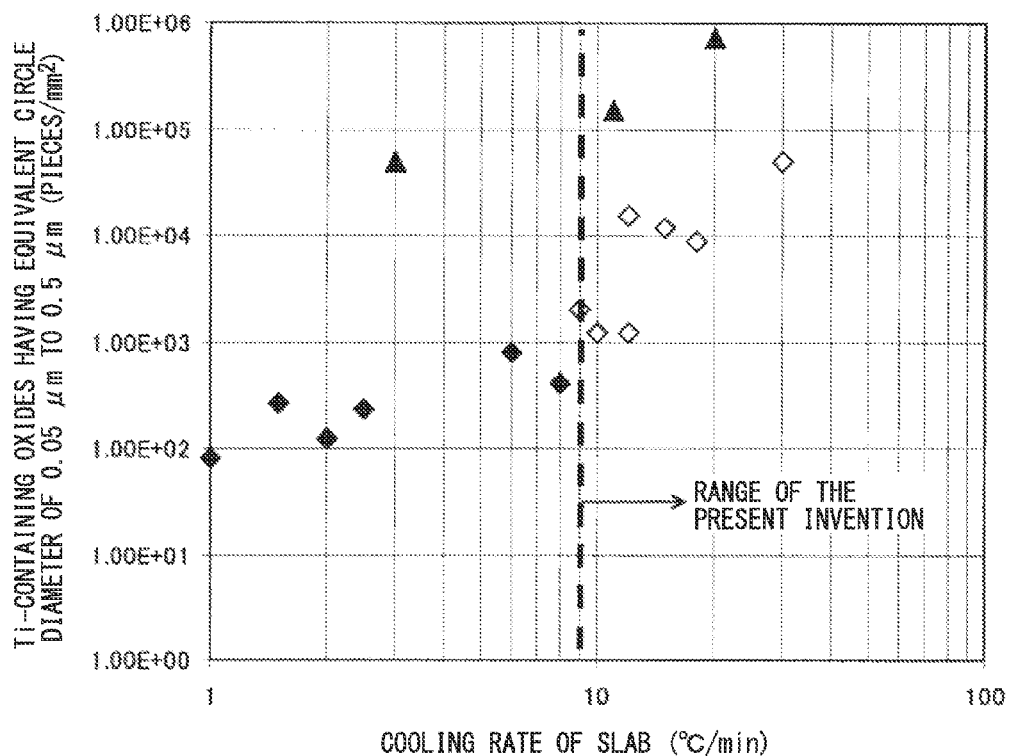
FIG. 8A is a diagram illustrating a correlation between the cooling rate of a slab and the number of fine oxide particles containing Ti and contained in the steel.
Figure 8B:
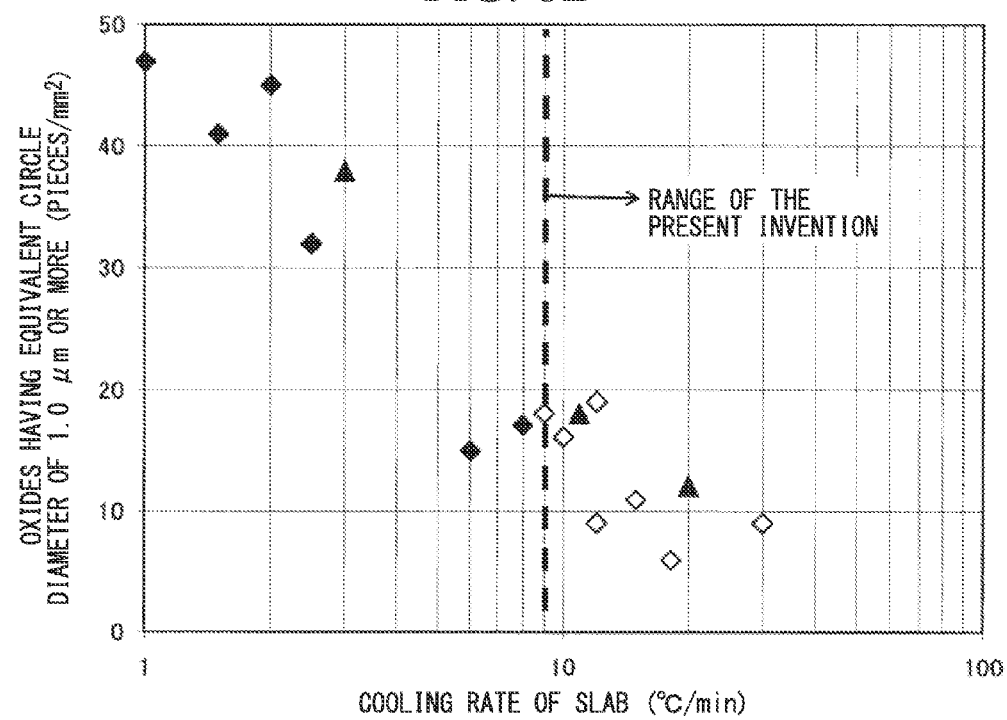
FIG. 8B is a diagram illustrating a correlation between the cooling rate of a slab and the number of coarse oxide particles contained in the steel.
Figure 9:
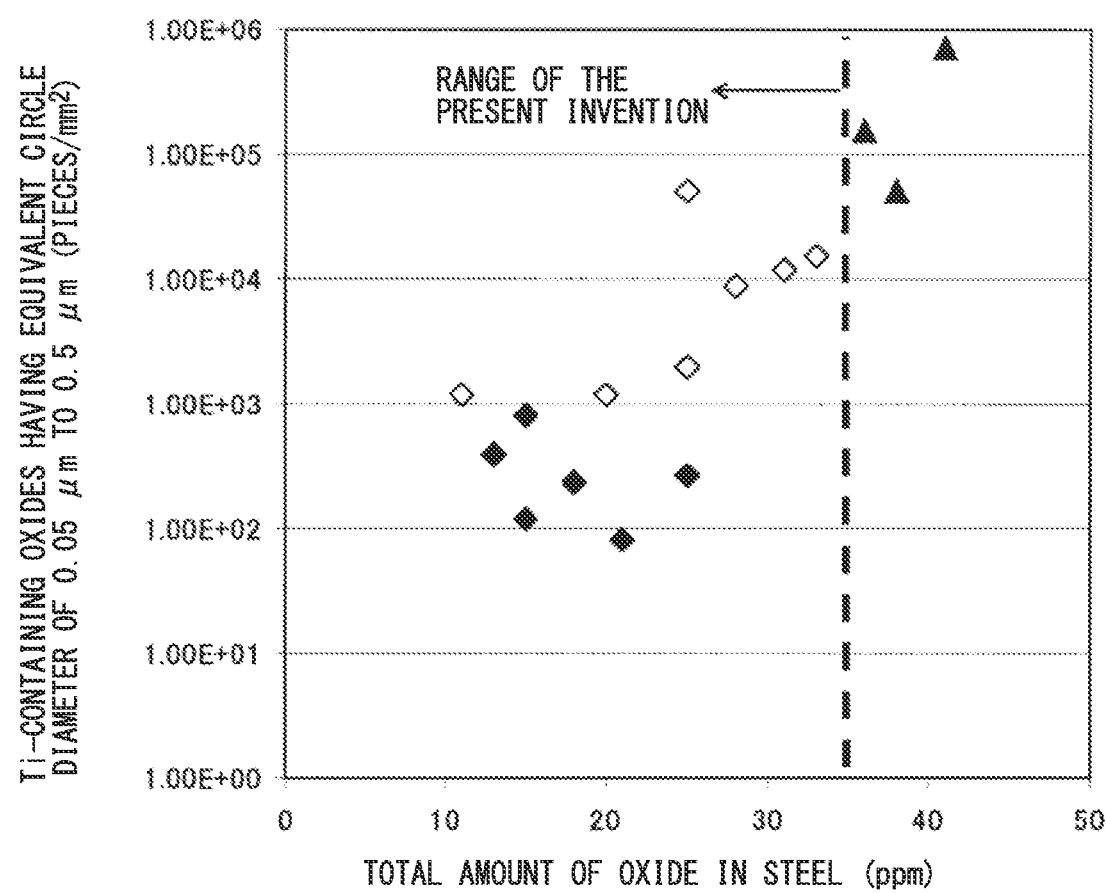
FIG. 9 is a diagram illustrating a correlation between a total amount of oxygen in the steel and the number of fine oxide particles containing Ti and contained in the steel.

Further, electron-beam welding used in Examples described later was applied to the steels and an I-groove butt-welded joint was manufactured. Details of the welding will be described in Examples below. CTOD test pieces having a notch formed at a fusion line (FL: Fusion Line) zone of the welded joint were manufactured, and CTOD tests were performed at a test temperature of 0° C. The sample was determined to be acceptable when HAZ fracture toughness value $\delta_{HAZ}$ which was obtained by the test was 0.5 mm or more, and the other samples were determined to be unacceptable. FIGS. 7 to 9 show the results of the preliminary tests. In FIGs., hollow marks represent samples determined to be acceptable in the CTOD tests, and solid marks represent samples determined to be unacceptable. In addition, rhombic marks represent samples in which an amount of oxygen in the steel is 0.0035% or less and triangle marks represent samples in which an amount of oxygen in the steel is more than 0.0035%.

FIG. 7 illustrates a relationship between the results of the CTOD tests and the numbers of the fine oxides containing Ti and the coarse oxides. In FIG. 7, all the marks of the welded joint determined to be acceptable in the CTOD tests (hollow rhombic marks) exist within a squared range with a broken line indicated as "range according to the present invention". More specifically, conditions in which CTOD value of HAZ, $\delta_{HAZ}$ was 0.5 mm or more is the conditions of (1) the number of oxides having the equivalent circle diameter of 1.0 μm or more (the coarse oxides) was 20 pieces/mm$^2$ or less at the thickness center portion of the steel and (2) the number of oxides containing Ti of 10% or more and having the equivalent circle diameter of 0.05 μm or more and less than 0.5 μm (the fine oxides containing Ti) was $1\times10^3$ pieces/mm$^2$ to $1\times10^5$ pieces/mm$^2$ at the thickness center portion.

Next, a study was made of a correlation between the cooling rate for the slabs in the temperature range of 1300° C. to 1100° C. and the number of the fine oxide particles containing Ti. As shown in FIG. 8A, the number of the fine oxide particles containing Ti in the thickness center portion tends to increase with the increase in the cooling rate. In particular, in the samples in which the total amount of oxygen in the steel was decreased to 0.0035% or less by a process of vacuum degassing (represented by the rhombic marks), the number of the oxides tends apparently to increase depending on the cooling rate when the cooling rate of the slab is 9° C./min or more. As a result, within the above-described range of the total amount of oxygen and the cooling rate, it was possible to control the number of the fine oxides containing Ti to be in the range of $1\times10^3$ pieces/mm$^2$ to $1\times10^5$ pieces/mm$^2$. In FIG. 8A, the cooling rate range is indicated with the broken line and the arrow as "range according to the present invention". Further, all the samples that satisfied the above-described range of the total amount of oxygen and the cooling rate have the CTOD value of HAZ, $\delta_{HAZ}$ of 0.5 mm or more (hollow rhombic marks).

Next, a study was made of a correlation between the cooling rate for the slabs in the temperature range of 1300° C. to 1100° C. and the number of the coarse oxide particles. As shown in FIG. 8B, the number of the coarse oxides in the thickness center portion tends to decrease with the increase in the cooling rate. In particular, in the samples in which the total amount of oxygen in the steel was decreased to 0.0035% or less by the process of vacuum degassing (represented by the rhombic marks), in a case in which the cooling rate of the slab was 9° C./min or more, the number of the coarse oxides containing Ti was in the range of 20 pieces/mm$^2$ or less. In FIG. 8B, the cooling rate range is indicated with the broken line and the arrow as "range according to the present invention".

Next, a study was made of a correlation between the total amount of oxygen in the steel and the number of the fine oxide particles containing Ti. As shown in FIG. 9, the number of the fine oxide particles containing Ti in the thickness center portion tends to increase with the increase of total amount of oxygen. In a case in which the total amount of oxygen is more than 0.0035%, even if the cooling rate of the slab was set to 9° C./min or more, the number of the fine oxides containing Ti may not be controlled to $1\times10^5$ pieces/mm$^2$ or less. In that case, it is considered that excessively formed oxide particles act as the starting point of the brittle fracture and degrade the CTOD test value. In FIG. 9, the range in which the total amount of oxygen is 0.0035% (35 ppm) or less is indicated with the broken line and the arrow as "range according to the present invention". Within the range of the amount of oxygen, all the samples in which the cooling rate of the cast slab was set to 9° C./min or more indicated $\delta_{HAZ}$ value of 0.5 mm or more (hollow rhombic marks).

On the basis of all the results of the preliminary tests, the present inventors obtained the following findings. It is possible to improve the fracture toughness of the heat-affected zone and the welded metal of the electron-beam welded joint, by (1) reducing the number of the coarse oxide particles existing at the thickness center portion, and (2) appropriately controlling the number of the fine oxide particles containing Ti acting as the nuclei for the intra-granular transformation. Further, it is effective to (3) control all the concentration of oxygen in the steel within the appropriate range and (4) control the cooling rate for the steel during casting to be in the appropriate range in order to control the size and the number of the oxide particles. In addition, it is considered that the required cooling rate for the slabs of 9° C./min, which is obtained through the preliminary tests, may vary depending on the conditions of equipment of ladle refining and casting in steel mill where the steel is melted and cast (for example, degree of vacuum of the vacuum degassing, and shapes of weir for casting). Thus, in order to improve the CTOD test results, it is only necessary to obtain a predetermined number of the oxides in predetermined composition ranges, and it is not always necessary to limit the cooling rate during casting to 9° C./min or more.

On the basis of the results of the preliminary tests described above, according to the present invention, the amount of C, the amount of 0, the CeEBW, the C/CeEB, and the size and the number of the oxide particles in the steel (base metal) are controlled to be in the appropriate range, an amount of Al is decreased, and an appropriate amounts of Ti is added. Thereby, during the electron-beam welding, it is possible that the fine oxides containing Ti are utilized as the pinning particles and the nuclei for intra-granular transformation, the ratio of the fracture toughness value of the welded metal and the heat-affected zone relative to the fracture toughness value of the base metal is controlled to the appropriate range, and dispersion in the fracture toughness value δc is suppressed as much as possible.

The steel according to the embodiment of the present invention includes as the composition, by mass %, at least, C: 0.02% to 0.10%, Si: 0.03% to 0.30%, Mn: 1.5% to 2.5%, Ti: 0.005% to 0.015%, N, 0.0020% to 0.0060%, and O: 0.0010% to 0.0035%. In addition, among unavoidable impurities included in the composition of the steel, it is necessary that S is limited to 0.010% or less, P is limited to 0.015% or less, and Al is limited to 0.004% or less. In addition, as necessary, the steel may include Nb: 0% to 0.020%, V: 0% to 0.030%, Cr: 0% to 0.50%, Mo: 0% to 0.50%, Cu: 0% to 0.25%, Ni: 0% to 0.50%, and B: 0% to 0.0030%. A balance of the composition of the steel consists of iron and the unavoidable impurities.

Hereinafter, the reason for adding elements and the amounts of the elements will be described. Here, the unit "%" represents mass %.

C is an element that contributes to improving the strength. In order to ensure the strength necessary for the welded structure, C of 0.02% or more is added. When the amount of C is insufficient, the hardenability of the welded metal may be insufficient and the toughness may deteriorate. The preferable lower limit is 0.03% and more preferable lower limit is 0.04%. On the other hand, when the amount of C is more than 0.10%, the hardenability excessively increases, and the toughnesses of the welded metal and the heat-affected zone deteriorate in particular. Thus, the upper limit of C is to be 0.10%. The preferable upper limit is 0.08% or 0.07%, and more preferable upper limit is 0.06%.

Si is a deoxidizing element and an element that is effective in ensuring the strength of the steel plate. Thus, Si of 0.03% or more is added. However, when Si is excessively added, an excessive amount of high-carbon martensite is formed in particular in the heat-affected zone, and the toughness deteriorates. Thus, upper limit of the amount of Si is to be 0.30%. The preferable upper limit is 0.25% or 0.20%, and more preferable upper limit is 0.15%.

Mn is an element that is effective in ensuring the toughness and the strength of the steel plate owing to enhancing the hardenability. When the amount of Mn is less than 1.5%, it is not possible to sufficiently obtain the toughness, strength, and hardenability of the steel. In addition, Mn evaporates and is lost from the welded metal during the electron-beam welding. Thus, in order to enhance the toughness, strength and hardenability of the steel and the hardenability of the welded metal to ensure the toughness, Mn of 1.5% or more is added.

The preferable lower limit of the amount of Mn is 1.6% or 1.7%, and more preferable lower limit is 1.8%. On the other hand, when the amount of Mn is more than 2.5%, the hardenability excessively increases, and the toughness of the heat-affected zone deteriorate in particular. Thus, the upper limit of the amount of Mn is to be 2.5%. The preferable upper limit is 2.4%, and more preferable upper limit is 2.3%.

P is an unavoidable impurity and has an adverse effect on the toughnesses of the steel (BM), the welded metal (WM), and the heat-affected zone (HAZ). In particular, in order to ensure the toughness of the welded metal (WM) and the heat-affected zone (HAZ), it is preferable to reduce the amount of P. Thus, the amount of P is limited to 0.015% or less. The preferable amount of P is 0.010% or less, or 0.006% or less. It is not necessary to limit the lower limit of the amount of P in particular, and the lower limit thereof may be 0%. However, in consideration of the manufacturing cost, the excessively low amount of P of 0.001% or less is not necessary, and the amount of P may be 0.001% or more.

S is an unavoidable impurity and forms MnS. MnS precipitates from the fine oxides containing Ti as nuclei, Mn-dilute region is formed, and thereby, the formation of the intra-granular ferrite (intra-granular transformation) is promoted. In order to promote the intra-granular transformation, it is preferable that the amount of S is 0.0001% or more. The preferable lower limit of the amount of S is 0.001%. As necessary, the lower limit of the amount of S may be 0.002%. Moreover, the lower limit of the amount of S may not be limited, and the lower limit may be 0%. On the other hand, when S is excessively added, the toughnesses of the welded metal (WM) and the heat-affected zone (HAZ) deteriorate in particular. Thus, the amount of S is limited to 0.010% or less. The preferable upper limit of the amount of S is 0.007% or 0.005%.

Al is a strong deoxidizing element and prevents the formation of the oxides containing Ti. In the embodiment of the present invention, in order to promote the formation of the oxides containing Ti, the amount of Al is limited to 0.004% or less. As necessary, the upper limit of the amount of Al may be limited to 0.003% or 0.0025%. Since the fewer the amount of Al is more preferable, it is not necessary to define the lower limit thereof and the lower limit may be 0%. On the other hand, the lower limit of the amount of Al may be 0.0005% or 0.001%.

Ti is a very important element in the present invention and is used for deoxidation of the steel. In order to form the oxides containing Ti, which act the nuclei for intra-granular transformation, into the welded metal (WM) and the heat-affected zone (HAZ) and to enhance the toughness, Ti of 0.0005% or more is added. It is preferable that the amount of Ti is 0.007% or more. However, when the amount of Ti is excessive, coarse TiN is formed and the toughness deteriorates. Therefore, the upper limit is to be 0.015%. The preferable upper limit of the amount of Ti is 0.012%.

N forms TiN by bonding to Ti. In order to suppress the grain coarsening caused by TiN, N of 0.0020% or more is added. The preferable lower limit of the amount of N is 0.0030%. On the other hand, when the amount of N is excessive, the toughnesses of the welded metal and the heat-affected zone deteriorate. Thus, the upper limit of the amount of N is to be 0.0060%. The preferable upper limit of the amount of N is 0.0050%.

O bonds to Ti, forms the oxides containing Ti which act as the pinning particles and the nuclei for intra-granular transformation, and enhances the toughnesses of the welded metal and the heat-affected zone. When the amount of O is insufficient, sufficient oxide particles containing Ti may not be obtained, therefore, the lower limit thereof is to be 0.0010%. On the other hand, when the amount of O is excessive, oxides, which act as the starting point of fracture, are excessively formed, and the toughness of the steel and the heat-affected zone are adversely influenced. Thus, the upper limit of the amount of O is to be 0.0035%. In the case where the excessive amount of the oxides are easily formed in the steel under conditions of the composition, the manufacturing processes, and the like. Thus, the upper limit of the amount of O of steel may be 0.0032%, 0.0029%, or 0.0025%. When more amount of the fine oxide particles containing Ti is needed, the lower limit of the amount of O of the steel may be 0.0020%. It should be noted that, by applying the electron-beam welding according to the embodiment of the present invention under general conditions, approximately half of the amount of O in the steel may dissipate from the welded metal portion in some cases. Thus, when the amount of O in the steel is 0.0035% or less, the amount of O in the welded metal of the welded joint after welding may be approximately 0.0020% or less in some cases. The amount of O of the welded metal may be less than 20 ppm, 18 ppm or less, or 17 ppm or less. Although it is not necessary to provide the lower limit of the amount of O of the welded metal, the amount of O may be 8 ppm or more, 10 ppm or more, or 12 ppm or more.

In the steel according to the embodiment of the present invention, it is not necessary to add Mg or Ca, and each of the amount of Mg and the amount of Ca in the unavoidable impurities may be limited to 0.0002% or less.

The steel according to the embodiment of the present invention may further include a predetermined amount of Nb and/or V for the following reasons.

Nb is an element that is effective in improving the hardenability and the strength of the base metal. Although addition of Nb is not indispensable, Nb may be added as necessary. In order to obtain the addition effect, Nb of 0.001% or more is added. It is preferable that Nb of 0.003% or more is added. However, when Nb is excessively added, the toughnesses of the welded metal (WM) and the heat-affected zone (HAZ) deteriorate. Thus, the upper limit of the amount of Nb is to be 0.020%. The upper limit is preferably 0.012%, and more preferably 0.010%. It is not necessary to limit the lower limit of the amount of Nb in particular, and the amount of Nb may be 0%.

V is an element that is effective in improving the hardenability and temper softening resistance with small amount of addition. Although addition of V is not indispensable, V may be added as necessary. In order to obtain the addition effect, V of 0.005% or more is added, and preferably, V of 0.010% or more is added. However, when V is excessively added, in particular, the toughnesses of the welded metal (WM) and the heat-affected zone (HAZ) deteriorate. Thus, the upper limit of the amount of V is to be 0.030%. The preferable upper limit is 0.025%, and more preferable upper limit is 0.020%. It is not necessary to limit the lower limit of the amount of V in particular, and the amount of V may be 0%.

The steel plate according to the embodiment of the present invention may further include at least one of Cr, Mo, Cu, Ni, and B as necessary. Although addition of the elements is not indispensable, the addition is effective in improving the hardenability and the strength. In order to obtain the effect, Cr, Mo, Cu, and/or Ni of 0.05% or more are respectively added. B is an element that significantly improves the hardenability with small amount of addition. In the case where securement of the cooling rate is difficult and the like, B whose upper limit is 0.0030% may be added as necessary. In order to obtain the improvement effect of the hardenability, B of 0.0002% or more may be added.

However, since Cr, Mo, Cu and Ni are expensive, the amounts of the addition are to be Cr of 0.50% or less, Mo of 0.50% or less, Cu of 0.25% or less, and Ni of 0.50% or less, from an economic standpoint. In particular, in the steel with large amount of Mn according to the embodiment of the present invention, when the elements are added in surplus, the hardenability excessively increases, which may result in deterioration in the balance of the toughness. Thus, it is preferably that the total amount of Cr, Mo, Cu and/or Ni is 0.70% or less. It is more preferably that the total amount is 0.50% or less. The total amount may be limited to 0.40%, 0.30%, or 0.20% as necessary. In order to prevent the steel from cracking or the like due to the addition of B, the upper limit of the amount of B may be limited to 0.0020%, 0.0017% or 0.0014%. It is not necessary to limit the lower limit of Cr, Mo, Cu, Ni, and B in particular, and the amounts of the addition may be 0% respectively.

According to the steel of the embodiment of the present invention, the index value of hardenability after electron-beam welding, CeEB which is defined as a following Formula 1 is to be 0.49% to 0.60%, while satisfying the above mentioned composition.

$$CeEB+9/40Mn+1/15Cu+1/15Ni+1/5Cr+1/5Mo+1/5V \quad \text{(Formula 1)}$$

where C, Mn, Cu, Ni, Cr, Mo and V represent amounts (mass %) of each element contained in the composition of the steel in the steel. It should be noted that, in the case where any of the elements is not added to the steel, 0 is substituted into the amount of the element for utilizing the Formula 1. For example, in the case where all of Cu, Ni, Cr, Mo, and V are not added to the steel, a following Formula 1' may be utilized for CeEB instead of the above Formula 1.

$$CeEB=C+9/40Mn \quad \text{(Formula 1')}$$

However, when Cu, Ni, Cr, Mo, and V are included as unavoidable impurities, it is preferable to calculate CeEB by using Formula 1.

The index value of hardenability after electron-beam welding, CeEB is an index which expresses the hardenability in consideration of the decrease in the amount of Mn in the welded metal at the time of electron-beam welding peculiarly. When CeEB is less than 0.49%, the hardenability of the welded metal is insufficient, upper bainite is formed, and the fracture toughness of the welded joint is insufficient.

When the CeEB is 0.50% or more, and preferably 0.51% or more, the fracture toughness of the steel is further improved. On the other hand, when CeEB exceeds 0.60%, the fracture toughness of the heat-affected zone (HAZ) becomes insufficient. Thus, the upper limit of the CeEB is preferably 0.59%, and more preferably 0.58%.

According to the steel of the embodiment of the present invention, the number of the oxides (coarse oxides) having the equivalent circle diameter of 1.0 μm or more is to be 20 pieces/mm$^2$ or less at the thickness center portion in a cross-section along the thickness direction. In addition, also at the thickness center portion, the number of the oxides containing 10% or more of Ti and having the equivalent circle diameter of 0.05 μm or more and less than 0.5 μm (fine oxides containing Ti) is to be $1 \times 10^3$ pieces/mm$^2$ to $1 \times 10^5$ pieces/mm$^2$. When the number of the coarse oxides is more than 20 pieces/mm$^2$, the coarse oxides act as the starting points of the fracture, and the fracture toughnesses of the heat-affected zone and the welded metal are insufficient. When the number of the fine oxides containing Ti is less than $1 \times 10^3$, the pinning effect and the intra-granular transformation promoting effect derived from the oxides containing Ti is insufficient, and the toughnesses of the heat-affected zone and the welded metal are adversely influenced. When the number of the fine oxides containing Ti is more than $1 \times 10^5$, a tendency that excessive oxide particles containing Ti act as the starting points of the fracture increases and the fracture toughnesses of the heat-affected zone and the welded metal become insufficient.

Moreover, the number of coarse oxides is measured, for example, by using test pieces taken from the thickness center portion in the cross-section along the thickness direction of the steel and by using FE-SEM (Field Emission Scanning Electron Microscope).

Moreover, the number of oxides containing Ti is measured, for example, by using test pieces taken from the thickness center portion in the cross-section along the thickness direction of the steel and by using FE-TEM (Field Emission Transmission Electron Microscope). Furthermore, extracted replica films are prepared and observed by using TEM, and particles of which the Ti ratio by weight is 10% or more, which is measured by using EDX (Energy Dispersive X-ray Spectrometry), are judged as oxides containing Ti of 10% or more.

The ratio (C/CeEB) of the amount of C relative to the index value of hardenability after electron-beam welding, CeEB is an index which expresses a balance between the hardenability of the welded metal and the hardenability of the heat-affected zone. It is preferable that C/CeEB is 0.04 to 0.18. In the electron-beam welding, since Mn evaporates, the amount of Mn in the welded metal may be less than the amount of Mn in the base metal. Thus, it is preferable to ensure the hardenability by increasing the amount of C in the base metal. However, when the amount of C is excessive, the high-carbon martensite is formed at the HAZ.

When C/CeEB is less than 0.04, the hardenability of the welded metal may be insufficient, and the fracture toughness may deteriorate. Thus, the lower limit may be 0.04. The preferable lower limit is 0.05. On the other hand, when C/CeEB is more than 0.18, the fracture toughness of the heat-affected zone may deteriorate. Thus, the upper limit may be 0.18. The preferable upper limit is 0.15, and more preferable upper limit is 0.10.

In the welded joint formed by the electron-beam welding using the steel according to the embodiment of the present invention, it is preferable that the CTOD value of the welded metal: $\delta_{WM}$, the CTOD value of the heat-affected zone: $\delta_{HAZ}$, and the CTOD value of the steel: $\delta_{BM}$ satisfy the following formula 2 and formula 3.

$$0.5 \leq \delta_{WM}/\delta_{BM} \leq 1.1 \quad \text{(Formula 2)}$$

$$0.5 \leq \delta_{HAZ}/\delta_{BM} \leq 1.1 \quad \text{(Formula 3)}$$

Herein, the $\delta_{WM}$, the $\delta_{HAZ}$, and the $\delta_{BM}$ are the minimum values of the CTOD values when three-point bending CTOD tests are carried out six times at 0° C. Although the $\delta_{BM}$ is the highest among the $\delta_{BM}$, the $\delta_{HAZ}$, and the $\delta_{WM}$, the upper limits of $\delta_{WM}/\delta_{BM}$ and $\delta_{HAZ}/\delta_{BM}$ may be 1.1 in consideration of unevenness of the measured data. When the CTOD value is 1.0 mm or more, it is considered that ductile fracture occurs, and the calculation is conducted by regarding the CTOD value as 1.0 mm.

When $\delta_{WM}/\delta_{BM}$ and $\delta_{HAZ}/\delta_{BM}$ are less than 0.5, a balance between the $\delta_{WM}$, the $\delta_{HAZ}$, and the $\delta_{BM}$ may excessively deteriorate, and the fracture toughness of the welded portion may notably deteriorate. Thus, the lower limits of $\delta_{WM}/\delta_{BM}$ and $\delta_{HAZ}$ SBM may be 0.5. The preferable lower limit is 0.60 and the more preferable lower limit is 0.7. The intra-granular transformation utilizing the fine oxides containing Ti is extremely effective in refining the structure of the HAZ and the WM, and the fracture toughnesses of the HAZ and the WM in the welded joint may extremely increase by electron-beam welding the steel according to the embodiment of the present invention.

In other words, according to the steel of the present invention, deterioration of the fracture toughness of the welded metal and the heat-affected zone in the welded joint after the electron-beam welding is extremely suppressed as compared with the fracture toughness of the base metal. Thus, it is possible to obtain the welded joint in which the fracture toughness of each zone is appropriately balanced.

The electron-beam welding can be conducted under low-vacuum condition which can be achieved using simple equipment, for example, under a reduced pressure of 10 Pa or less. Although depending on the ability of the equipment, the lower limit of the degree of vacuum is preferably $10^{-2}$ Pa. The welding conditions are determined depending on the ability of the equipment and the thickness of steels within ranges in which accelerating voltage is 130 V to 180 V, beam current is 100 mA to 130 mA, and welding speed is 100 mm/min to 250 min/min. For example, when the thickness is 80 mm, it is recommended that the accelerating voltage is approximately 175V, the beam current is approximately 120 mA, and the welding speed is approximately 125 mm/min.

Next, the method of manufacturing the steel of the present invention will be described. In the method according to the present invention, it is possible to limit the number of the coarse oxides to 20 pieces/mm² or less, for example, by cooling at a rate of 9° C./min or more in a casting process for casting the steel such as the slab (steel piece). At the same time, it is possible to obtain the fine Ti nitride particles of $1 \times 10^3$ or more.

A continuous casting method is preferable as the method of manufacturing the steel (steel piece) from an industrial standpoint. It is possible to suppress the forming of the coarse oxides which cause fractures by increasing the cooling rate after casting in the continuous casting method. Thus, the continuous casting method is preferable in order to improve the toughness.

A specific method of increasing the cooling rate for the slab to 9° C./min or more in the continuous casting includes an increase in pressure and quantity of water at a cooling zone of in the continuous casting machine, a decrease in thickness of a casting mold, and a decrease in thickness of the slab by rolling a unsolidified layer of the slab. In the case where the method is applied, the upper limit of the cooling rate for the slab may be approximately 30° C./min in general.

In the method according to the present invention, the casted steel (steel piece) having the composition is heated to 950° C. to 1150° C. When the heating temperature is less than 950° C., deformation resistance during hot rolling is large, and the productivity deteriorates. On the other hand, when the steel is heated to more than 1150° C., Ti nitrides in the steel (steel piece) are coarsened, and the toughnesses of the steel (base metal) and the heat-affected zone may deteriorate.

After the steel (steel piece) is heated to 950° C. to 1150° C., Thermomechanical treatment (TMCP: Thermo-mechanical controlled processing) is conducted in order to obtain the required strength or toughness of the steel. The thermomechanical treatment is effective in improving the strength and the toughness of the steel, and includes, for example, (1) controlled rolling (CR), (2) controlled rolling-accelerated cooling (ACC), (3) direct quenching after rolling-tempering (direct quenching and tempering: DQT), and the like. In the present invention, (2) the controlled rolling-accelerated cooling (ACC) and (3) the direct quenching after rolling-tempering are preferable in order to improve the fracture toughness.

The controlled rolling conducted in a non-recrystallization temperature range (approximately 900° C. or less) is effective in refining the structure of the steel and in improving the strength and the toughness. In the present invention, it is preferable to finish the controlled rolling at a temperature equal to or higher than $Ar_3$ transformation point in order to prevent formation of deformed ferrite.

In particular, by consecutively conducting the accelerated cooling after the controlled rolling, hard phases such as bainite and martensite are formed, which leads to improvement in the strength. In order to ensure the strength and the toughness, it is preferable that the finishing temperature of the accelerated cooling is 400° C. to 600° C. The direct quenching after rolling is the method such that the quenching is conducted by water cooling and the like after performing the hot rolling in a temperature range which is higher than that for the controlled rolling. In the method, since the strength excessively increases in general, the tempering is conducted in order to ensure the toughness. A tempering temperature is preferably 400° C. to 650° C.

EXAMPLES

Next, Examples according to the present invention will be described. Conditions for Examples are merely examples of conditions used for checking applicability and effects of the present invention, and conditions for the present invention are not limited to these examples of conditions. Further, various conditions may be employed in the present invention within the scope of the present invention, provided that the objects of the present invention can be achieved.

Steels were manufactured using steels containing the composition shown in Table 1 and Table 2 under conditions shown in Table 3 and Table 4. Test pieces were taken from the steels, were subjected to tensile tests and CTOD tests, and were measured for the tensile strength and the fracture toughness of the base metal. The strength of the base metal was measured on the basis of JIS Z 2241, by taking test pieces from a thickness ½ portion so that a longitudinal direction was a rolling direction.

An electron-beam welding was applied to the steels to form I-groove butt-welded joints. The electron-beam welding which employed a RPEBW method was conducted under conditions such that degree of vacuum was approximately 1 mbar, voltage was 175 V, current was 120 mA, and a welding rate was approximately 125 mm/minute. The weld bead width was 3.0 mm to 5.5 mm.

Figure 6:
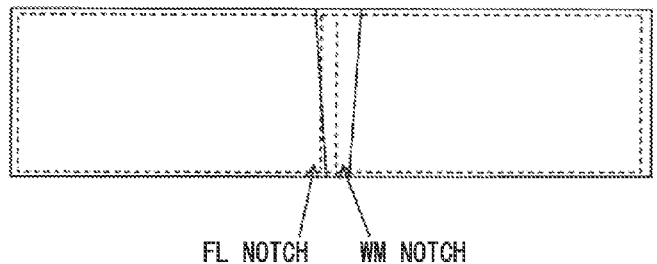
FIG. 6 is a diagram illustrating a test piece having a notch.

And, from the welded joint, (a) six test pieces having a size of t (thickness)×2t were taken when the thickness was less than 60 mm, whereas (b) six test pieces having a size of t (thickness)×t were taken when the thickness was 60 mm or more. A 50% fatigue crack was applied to the test pieces as a notch to a central portion of a welded metal (WM), a fusion line zone (FL), and a base metal (BM). FIG. 6 shows the test piece having the notch applied thereto.

Moreover, since width of a heat-affected zone of the electron-beam welded joint was narrow, CTOD value $\delta_{HAZ}$ of the heat-affected zone was measured by using test pieces having the notch applied to the fusion line.

CTOD tests were performed at a test temperature of 0° C. to obtain fracture toughness value $\delta_c$. Moreover, when the CTOD value was 1.0 or more, it was considered that ductile fracture occurred, and the calculation was conducted by regarding the CTOD value as 1.0 mm. The fracture toughness values of $\delta_{WM}$, the $\delta_{HAZ}$, and $\delta_{BM}$ were the minimum values among the six test pieces at each notch. Table 3 and Table 4 show $\delta_{WM}/\delta_{BM}$ and $\delta_{HAZ}/\delta_{BM}$ based on the CTOD value of the welded metal (WM) $\delta_{WM}$, the CTOD value of the heat-affected zone (HAZ) $\delta_{HAZ}$, and the CTOD value of the base metal (BM) $\delta_{BM}$ of the welded joint.

Number of oxide particles in the steel was measured through the following method. For observation of oxides having an equivalent circle diameter of 1.0 µm or more (coarse oxides), test pieces taken from a thickness center portion in a cross-section along a thickness direction of the steel were prepared from each of the steels, and the size and the number of the particles were measured by using FE-SEM (Field Emission Scanning Electron Microscope). For observation of oxides having an equivalent circle diameter of 0.05 µm or more and less than 0.5 µm (fine oxides containing Ti), test pieces were similarly taken from the thickness center portion, extracted replica films were prepared by using the test pieces and by electrolytic polishing which employed a SPEED method (Selective Potentiostatic Etching by Electrolytic Dissolution), and the test pieces were observed by using FE-TEM (Field Emission Transmission Electron Microscope) at a magnification of 10000-fold to 1000000-fold. Oxides of which the Ti ratio by weight measured by characteristic X-radiation of EDX (Energy Dispersive X-ray Spectrometry) is 10% or more was judged as the oxides containing Ti. The size and the number of the oxides containing Ti were measured from the results. The observations at visual fields of 20 or more were conducted at the thickness center portion of each test piece, and average value of the number of the oxide particles (the coarse oxides and the fine oxides containing Ti) per unit area were calculated.

[Table 1]

Blank columns indicate that no alloying element was intentionally added.

[Table 2]

Underlines indicate that the values were outside the range or outside the preferable range of the present invention. Blank columns indicate that no alloying element was intentionally added.

[Table 3]

Words written in the columns of the thermomechanical treatment indicate the following:

CR: controlled rolling (rolling at an optimal temperature for the strength and toughness), ACC: accelerated cooling (water cooling to a temperature range of 400° C. to 600° C. after controlled rolling), and DQT: quenching immediately after rolling, and tempering.

When the toughness value (CTOD value) was 1.0 mm or more, it was considered that ductile fracture occurred, and the calculation was conducted by regarding the toughness value as 1.0 mm.

[Table 4]

Underlines indicate that the values were that of conventional example, or that the values were outside of the preferable range of the present invention.

Words written in the columns of the thermomechanical treatment indicate the following:

CR: controlled rolling (rolling at an optimal temperature for the strength and toughness), ACC: accelerated cooling (water cooling to a temperature range of 400° C. to 600° C. after controlled rolling), and DQT: quenching immediately after rolling, and tempering.

When the toughness value (CTOD value) was 1.0 mm or more, it was considered that ductile fracture occurred, and the calculation was conducted by regarding the toughness value as 1.0 mm. Target value of $\delta_c$ was to be 0.5 mm or more, and the value of 0.5 mm or more was judged to be acceptable.

As shown in Table 1 and Table 3, in steels No. 1 to No. 31 which are the example according to the present invention, all of the composition, CeEB, and C/CeEB are within the range of the present invention, and $\delta_{HAZ}/\delta_{BM}$ and $\delta_{WM}/\delta_{BM}$ which are ratios of $\delta_c$ of the base material (BM), the heat-affected zone (HAZ), and the welded metal (WM) exhibit sufficient values.

On the other hand, as shown in Table 2 and Table 4, in steel No. 32, since an amount of C is insufficient, an amount of Mn is excessive, CeEB is higher, and C/CeEB is lower, Thus, CTOD values of the heat-affected zone (HAZ) and the welded metal (WM) were lower, and values of $\delta_{HAZ} \delta_{BM}$ and $\delta_{WM}/\delta_{BM}$ were insufficient.

In steel No. 33, since an amount of C is excessive and C/CeEB is higher, CTOD values of the heat-affected zone (HAZ) and the welded metal (WM) were lower and values of $\delta_{HAZ}/\delta_{BM}$ and $\delta_{WM}/\delta_{BM}$ were insufficient. In steel No. 35, since an amount of Mn is insufficient and CeEB is lower. Thus, strength of the base metal (BM) was lower, hardenability of the welded metal (WM) was insufficient, CTOD value of the welded metal (WM) decreased, and value of $\delta_{WM}/\delta_{BM}$ was insufficient.

In steel No. 34, since an amount of Si is excessive, brittle phase formed excessively, CTOD value of the heat-affected zone (HAZ) was lower, and value of $\delta_{HAZ}/\delta_{BM}$ was insufficient. In steel No. 36, since an amount of Mn is excessive and C/CeEB is higher, CTOD value of the heat-affected zone (HAZ) decreased and value of $\delta_{HAZ}\delta_{BM}$ was insufficient.

In steels No. 37 and No. 38, since an amount of P and an amount of S are respectively excessive, CTOD values of the heat-affected zone (HAZ) and the welded metal (WM) were lower and values of $\delta_{HAZ}/\delta_{BM}$ and $\delta_{WM}/\delta_{BM}$ were insufficient. In steels No. 39 and No. 40, since an amount of Nb and an amount of V are respectively excessive, CTOD values of the heat-affected zone (HAZ) and the welded metal (WM) were lower and values of $\delta_{HAZ}/\delta_{BM}$ and $\delta_{WM}/\delta_{BM}$ were insufficient.

In steel No. 41, an amount of Ti is insufficient. In steel No. 43, an amount of Al is excessive. Thus, since the oxides which act as nuclei for intra-granular transformation ferrite is lower in such steels, CTOD values of the heat-affected zone (HAZ) and the welded metal (WM) were lower and values of $\delta_{HAZ}/\delta_{BM}$ and $\delta_{WM}/\delta_{BM}$ were insufficient. In steel No. 45, since an amount of O is insufficient, intra-granular transformation was insufficient, CTOD values of the heat-affected zone (HAZ) and the welded metal (WM) were lower and values of $\delta_{HAZ}/\delta_{BM}$ and $\delta_{WM}/\delta_{BM}$ were insufficient.

In steel No. 42, an amount of Ti is excessive. In steel No. 44, an amount of N is excessive. Thus, CTOD values of the heat-affected zone (HAZ) and the welded metal (WM) were lower and values of $\delta_{HAZ}/\delta_{BM}$ and $\delta_{WM}/\delta_{BM}$ were insufficient.

In steel No. 46, an amount of O is excessive. Thus, since oxides which act as the starting point of fracture are excessive, CTOD values of the heat-affected zone (HAZ) and the welded metal (WM) are lower and values of $\delta_{HAZ}/\delta_{BM}$ and $\delta_{WM}/\delta_{BM}$ are insufficient.

In steels No. 47 to No. 48, the compositions of the steels are within the range of the present invention. However, in steel No. 47, CeEB is lower, and in steel No. 48, C/CeEB is lower. Thus, in such steels, hardenability of the welded metal (WM) was insufficient, CTOD value decreased, and value of $\delta_{WM}/\delta_{BM}$ was insufficient.

In steel No. 49, CeEB is higher, and in steel No. 50, C/CeEB is higher. Thus, CTOD value of the heat-affected zone (HAZ) was lower and value of $\delta_{WM}/\delta_{BM}$ was insufficient.

In steel No. 51, the compositions of the steel are within the range of the present invention. However, since casting speed is slower, the oxides having an equivalent circle diameter of 1.0 μm or more is excessive at the thickness center portion of the steel. Thus, CTOD value of the heat-affected zone (HAZ) was lower and value of $\delta_{WM}/\delta_{BM}$ was insufficient.

INDUSTRIAL APPLICABILITY

According to an electron-beam welded joint of a steel with a yield strength of 355 MPa grade of the present invention, the deterioration in the fracture toughnesses of a welded metal and a heat-affected zone is suppressed as compared with the fracture toughness of a base metal. Thus, it is possible to manufacture the electron-beam-welded joint in which the fracture toughness of each zone is appropriately balanced. In addition, since the grain diameter and number of oxide particles are appropriately controlled, the fracture toughness is excellent. Thus, it is possible to provide the steel which is suitable for constituting a foundation portion of a tower of a wind power generator at sea at a low cost. Therefore, the present invention has high industrial applicability in the field of large scale steel structure construction.

TABLE 1

| STEEL No. | CHEMICAL COMPOSITION (mass %) | | | | | | | | | | | |
|---|---|---|---|---|---|---|---|---|---|---|---|---|
| | C | Si | Mn | P | S | Ti | Al | N | O | Nb | V | Cu |
| 1 | 0.022 | 0.14 | 2.45 | 0.005 | 0.002 | 0.010 | 0.002 | 0.0035 | 0.0024 | | | |
| 2 | 0.031 | 0.08 | 2.32 | 0.005 | 0.009 | 0.011 | 0.003 | 0.0032 | 0.0030 | 0.003 | | 0.14 |
| 3 | 0.032 | 0.08 | 2.41 | 0.006 | 0.003 | 0.006 | 0.003 | 0.0035 | 0.0026 | | 0.021 | |
| 4 | 0.030 | 0.03 | 2.11 | 0.007 | 0.005 | 0.010 | 0.002 | 0.0037 | 0.0017 | 0.020 | | |
| 5 | 0.035 | 0.09 | 2.25 | 0.015 | 0.006 | 0.011 | 0.002 | 0.0041 | 0.0035 | 0.001 | | |
| 6 | 0.037 | 0.24 | 2.24 | 0.006 | 0.003 | 0.012 | 0.003 | 0.0045 | 0.0032 | | | 0.23 |
| 7 | 0.037 | 0.10 | 2.15 | 0.005 | 0.006 | 0.011 | 0.002 | 0.0037 | 0.0019 | | | |
| 8 | 0.039 | 0.14 | 2.30 | 0.008 | 0.003 | 0.009 | 0.003 | 0.0059 | 0.0019 | 0.002 | 0.025 | |
| 9 | 0.041 | 0.10 | 2.07 | 0.006 | 0.008 | 0.013 | 0.003 | 0.0042 | 0.0029 | | | 0.15 |
| 10 | 0.042 | 0.11 | 2.15 | 0.006 | 0.005 | 0.012 | 0.002 | 0.0039 | 0.0017 | 0.007 | | |
| 11 | 0.044 | 0.11 | 2.04 | 0.009 | 0.002 | 0.010 | 0.002 | 0.0032 | 0.0033 | | | |
| 12 | 0.045 | 0.10 | 1.90 | 0.008 | 0.001 | 0.014 | 0.003 | 0.0036 | 0.0020 | 0.011 | | |
| 13 | 0.045 | 0.09 | 2.23 | 0.005 | 0.002 | 0.009 | 0.003 | 0.0020 | 0.0031 | | 0.019 | |
| 14 | 0.048 | 0.10 | 1.95 | 0.004 | 0.001 | 0.011 | 0.004 | 0.0032 | 0.0025 | 0.011 | | |
| 15 | 0.049 | 0.12 | 2.08 | 0.005 | 0.001 | 0.009 | 0.004 | 0.0036 | 0.0020 | | | |
| 16 | 0.047 | 0.10 | 2.19 | 0.004 | 0.002 | 0.010 | 0.004 | 0.0030 | 0.0019 | 0.005 | | |
| 17 | 0.050 | 0.10 | 2.11 | 0.004 | 0.001 | 0.012 | 0.004 | 0.0040 | 0.0025 | 0.002 | | |
| 18 | 0.049 | 0.09 | 2.14 | 0.011 | 0.001 | 0.009 | 0.003 | 0.0039 | 0.0024 | 0.003 | | 0.22 |
| 19 | 0.050 | 0.13 | 1.86 | 0.006 | 0.002 | 0.011 | 0.002 | 0.0036 | 0.0018 | | | |
| 20 | 0.051 | 0.13 | 1.82 | 0.006 | 0.003 | 0.010 | 0.002 | 0.0037 | 0.0018 | | | |
| 21 | 0.052 | 0.14 | 2.29 | 0.006 | 0.003 | 0.011 | 0.002 | 0.0037 | 0.0016 | | | |
| 22 | 0.054 | 0.11 | 1.82 | 0.005 | 0.010 | 0.009 | 0.003 | 0.0029 | 0.0024 | 0.003 | 0.020 | |
| 23 | 0.056 | 0.09 | 1.94 | 0.006 | 0.002 | 0.011 | 0.003 | 0.0034 | 0.0025 | 0.006 | 0.016 | |
| 24 | 0.059 | 0.14 | 1.75 | 0.005 | 0.003 | 0.011 | 0.002 | 0.0041 | 0.0012 | 0.007 | | 0.19 |
| 25 | 0.057 | 0.13 | 1.86 | 0.006 | 0.003 | 0.009 | 0.002 | 0.0045 | 0.0012 | 0.010 | | 0.10 |
| 26 | 0.059 | 0.15 | 2.05 | 0.007 | 0.002 | 0.010 | 0.002 | 0.0037 | 0.0012 | | | 0.15 |
| 27 | 0.073 | 0.06 | 2.16 | 0.007 | 0.002 | 0.009 | 0.002 | 0.0057 | 0.0023 | | | |
| 28 | 0.081 | 0.10 | 1.80 | 0.005 | 0.004 | 0.011 | 0.002 | 0.0044 | 0.0022 | | | 0.10 |
| 29 | 0.082 | 0.07 | 1.94 | 0.005 | 0.003 | 0.012 | 0.002 | 0.0037 | 0.0023 | 0.011 | | |
| 30 | 0.098 | 0.05 | 2.11 | 0.006 | 0.004 | 0.011 | 0.002 | 0.0043 | 0.0021 | | | 0.12 |
| 31 | 0.045 | 0.09 | 2.23 | 0.005 | 0.002 | 0.009 | 0.003 | 0.0020 | 0.0028 | | | |

TABLE 1-continued

| STEEL No. | CHEMICAL COMPOSITION (mass %) | | | | CeEB (%) | C/CeEB | REMARKS |
|---|---|---|---|---|---|---|---|
| | Ni | B | Cr | Mo | | | |
| 1 | 0.20 | | | | 0.59 | 0.04 | EXAMPLE |
| 2 | 0.31 | | | | 0.58 | 0.05 | ACCORDING |
| 3 | | | | | 0.58 | 0.06 | TO THE |
| 4 | | | | | 0.50 | 0.06 | PRESENT |
| 5 | 0.35 | | | | 0.56 | 0.06 | INVENTION |
| 6 | | | | | 0.56 | 0.07 | |
| 7 | | | | | 0.52 | 0.07 | |
| 8 | | | | | 0.56 | 0.07 | |
| 9 | 0.48 | | | | 0.55 | 0.07 | |
| 10 | | | | | 0.53 | 0.08 | |
| 11 | | | | | 0.50 | 0.09 | |
| 12 | | | 0.50 | | 0.57 | 0.08 | |
| 13 | | | | | 0.55 | 0.08 | |
| 14 | | | | | 0.49 | 0.10 | |
| 15 | | | | | 0.52 | 0.09 | |
| 16 | | | | | 0.54 | 0.09 | |
| 17 | 0.45 | | | | 0.55 | 0.09 | |
| 18 | 0.25 | | | | 0.56 | 0.09 | |
| 19 | | | 0.50 | | 0.57 | 0.09 | |
| 20 | | | | 0.50 | 0.56 | 0.09 | |
| 21 | | | | | 0.57 | 0.09 | |
| 22 | | | | 0.49 | 0.57 | 0.10 | |
| 23 | | | | | 0.50 | 0.11 | |
| 24 | 0.20 | | | 0.06 | 0.49 | 0.12 | |
| 25 | 0.44 | | 0.31 | | 0.57 | 0.10 | |
| 26 | 0.25 | | | | 0.55 | 0.11 | |
| 27 | | | | | 0.56 | 0.13 | |
| 28 | 0.31 | | | | 0.51 | 0.16 | |
| 29 | | | | | 0.52 | 0.16 | |
| 30 | 0.11 | | | | 0.59 | 0.17 | |
| 31 | | 0.0015 | | | 0.55 | 0.08 | |

TABLE 2

| STEEL No. | CHEMICAL COMPOSITION (mass %) | | | | | | | | | | | |
|---|---|---|---|---|---|---|---|---|---|---|---|---|
| | C | Si | Mn | P | S | Ti | Al | N | O | Nb | V | Cu |
| 32 | 0.015 | 0.11 | 2.63 | 0.009 | 0.003 | 0.010 | 0.003 | 0.0032 | 0.0031 | | | |
| 33 | 0.118 | 0.14 | 1.91 | 0.007 | 0.004 | 0.011 | 0.003 | 0.0039 | 0.0021 | 0.015 | | |
| 34 | 0.075 | 0.34 | 1.91 | 0.006 | 0.003 | 0.010 | 0.002 | 0.0029 | 0.0025 | 0.011 | 0.019 | |
| 35 | 0.022 | 0.18 | 1.48 | 0.007 | 0.004 | 0.013 | 0.003 | 0.0035 | 0.0010 | 0.019 | 0.020 | |
| 36 | 0.031 | 0.11 | 2.63 | 0.006 | 0.001 | 0.009 | 0.003 | 0.0034 | 0.0024 | | | |
| 37 | 0.049 | 0.06 | 1.97 | 0.017 | 0.006 | 0.011 | 0.002 | 0.0037 | 0.0018 | 0.010 | | |
| 38 | 0.037 | 0.14 | 1.80 | 0.007 | 0.013 | 0.010 | 0.003 | 0.0032 | 0.0024 | 0.008 | | 0.21 |
| 39 | 0.083 | 0.08 | 2.09 | 0.006 | 0.003 | 0.009 | 0.004 | 0.0037 | 0.0025 | 0.023 | | |
| 40 | 0.095 | 0.11 | 1.86 | 0.008 | 0.004 | 0.009 | 0.004 | 0.0034 | 0.0019 | 0.011 | 0.032 | 0.10 |
| 41 | 0.055 | 0.10 | 2.11 | 0.005 | 0.002 | 0.004 | 0.004 | 0.0037 | 0.0022 | | | |
| 42 | 0.075 | 0.09 | 2.03 | 0.005 | 0.002 | 0.017 | 0.004 | 0.0034 | 0.0025 | | | |
| 43 | 0.040 | 0.15 | 1.89 | 0.006 | 0.003 | 0.009 | 0.007 | 0.0038 | 0.0030 | 0.020 | 0.025 | 0.10 |
| 44 | 0.082 | 0.09 | 2.12 | 0.005 | 0.004 | 0.018 | 0.004 | 0.0077 | 0.0025 | 0.018 | 0.024 | |
| 45 | 0.080 | 0.10 | 2.09 | 0.006 | 0.005 | 0.009 | 0.004 | 0.0036 | 0.0006 | 0.019 | | |
| 46 | 0.037 | 0.09 | 2.16 | 0.006 | 0.004 | 0.011 | 0.002 | 0.0039 | 0.0053 | 0.001 | 0.030 | |
| 47 | 0.051 | 0.11 | 1.89 | 0.006 | 0.003 | 0.011 | 0.002 | 0.0035 | 0.0020 | | | |
| 48 | 0.020 | 0.09 | 2.37 | 0.004 | 0.005 | 0.009 | 0.003 | 0.0031 | 0.0022 | | | 0.18 |
| 49 | 0.071 | 0.11 | 2.39 | 0.003 | 0.003 | 0.010 | 0.004 | 0.0029 | 0.0018 | | | |
| 50 | 0.092 | 0.10 | 1.79 | 0.005 | 0.003 | 0.011 | 0.002 | 0.0036 | 0.0023 | | | |
| 51 | 0.073 | 0.06 | 2.16 | 0.007 | 0.002 | 0.009 | 0.002 | 0.0057 | 0.0023 | | | |

| STEEL No. | CHEMICAL COMPOSITION (mass %) | | | | CeEB (%) | C/CeEB | REMARKS |
|---|---|---|---|---|---|---|---|
| | Ni | B | Cr | Mo | | | |
| 32 | | | | | 0.61 | 0.02 | CONVENTIONAL |
| 33 | | | | | 0.55 | 0.22 | EXAMPLE |
| 34 | | | | | 0.51 | 0.15 | |
| 35 | 0.45 | | | | 0.39 | 0.06 | |
| 36 | | | | | 0.62 | 0.05 | |
| 37 | | | | | 0.49 | 0.10 | |
| 38 | 0.46 | | | | 0.49 | 0.08 | |

TABLE 2-continued

|    |      |      |      |
|----|------|------|------|
| 39 |      | 0.55 | 0.15 |
| 40 |      | 0.53 | 0.18 |
| 41 |      | 0.53 | 0.10 |
| 42 |      | 0.53 | 0.14 |
| 43 | 0.20 | 0.49 | 0.08 |
| 44 |      | 0.56 | 0.15 |
| 45 | 0.29 | 0.57 | 0.14 |
| 46 |      | 0.53 | 0.07 |
| 47 |      | 0.48 | 0.11 |
| 48 | 0.16 | 0.58 | 0.03 |
| 49 |      | 0.61 | 0.12 |
| 50 |      | 0.49 | 0.19 |
| 51 |      | 0.56 | 0.13 |

TABLE 3

| STEEL No. | MANUFACTURING CONDITION | | | | PROPERTIES OF BASE METAL | | | |
|---|---|---|---|---|---|---|---|---|
| | COOLING RATE OF SLAB (° C./min) | HEATING TEMPERATURE OF STEEL PIECE (° C.) | THERMO-MECHANICAL TREATMENT | THICKNESS (mm) | YIELD STRENGTH (MPa) | TENSILE STRENGTH (MPa) | OXIDES HAVING Ti AND HAVING EQUIVALENT CIRCLE DIAMETER OF 0.05 μm TO 0.5 μm (PIECES/mm$^2$) | TOTAL NUMBER OF OXIDES HAVING EQUIVALENT CIRCLE DIAMETER OF 1.0 μm OR MORE (PIECES/mm$^2$) |
| 1 | 10 | 1050 | ACC | 50 | 388 | 511 | $7.2 \times 10^3$ | 10 |
| 2 | 12 | 1050 | ACC | 60 | 401 | 510 | $7.6 \times 10^2$ | 8 |
| 3 | 9 | 1100 | ACC | 65 | 377 | 487 | $1.2 \times 10^4$ | 19 |
| 4 | 16 | 1050 | ACC | 60 | 385 | 503 | $1.3 \times 10^4$ | 13 |
| 5 | 12 | 1050 | ACC | 60 | 399 | 501 | $1.6 \times 10^4$ | 18 |
| 6 | 11 | 1050 | ACC | 80 | 378 | 489 | $6.6 \times 10^3$ | 18 |
| 7 | 13 | 1100 | ACC | 50 | 385 | 503 | $1.8 \times 10^4$ | 19 |
| 8 | 14 | 1050 | ACC | 60 | 399 | 501 | $3.9 \times 10^3$ | 14 |
| 9 | 16 | 1100 | CR | 55 | 378 | 489 | $1.4 \times 10^4$ | 13 |
| 10 | 10 | 1100 | ACC | 60 | 399 | 501 | $7.7 \times 10^3$ | 20 |
| 11 | 12 | 950 | ACC | 65 | 378 | 489 | $1.0 \times 10^4$ | 12 |
| 12 | 9 | 1050 | ACC | 65 | 385 | 503 | $1.2 \times 10^4$ | 18 |
| 13 | 14 | 1050 | CR | 90 | 399 | 501 | $1.6 \times 10^4$ | 16 |
| 14 | 12 | 1100 | ACC | 80 | 385 | 503 | $1.4 \times 10^4$ | 17 |
| 15 | 16 | 1050 | ACC | 75 | 399 | 501 | $1.4 \times 10^4$ | 13 |
| 16 | 12 | 1050 | ACC | 55 | 378 | 489 | $1.6 \times 10^4$ | 19 |
| 17 | 9 | 1000 | DQT | 100 | 399 | 501 | $8.4 \times 10^3$ | 13 |
| 18 | 10 | 1050 | ACC | 65 | 378 | 489 | $1.4 \times 10^4$ | 20 |
| 19 | 9 | 1050 | CR | 50 | 385 | 501 | $1.0 \times 10^4$ | 16 |
| 20 | 13 | 1100 | DQT | 130 | 399 | 489 | $1.2 \times 10^4$ | 13 |
| 21 | 12 | 1050 | ACC | 60 | 378 | 503 | $1.3 \times 10^4$ | 17 |
| 22 | 10 | 1050 | ACC | 70 | 385 | 501 | $1.0 \times 10^4$ | 14 |
| 23 | 15 | 1000 | ACC | 90 | 399 | 501 | $2.0 \times 10^4$ | 13 |
| 24 | 9 | 1050 | DQT | 120 | 385 | 503 | $9.7 \times 10^2$ | 15 |
| 25 | 10 | 950 | ACC | 45 | 399 | 501 | $1.4 \times 10^4$ | 20 |
| 26 | 16 | 1100 | ACC | 80 | 378 | 489 | $1.8 \times 10^4$ | 16 |
| 27 | 11 | 1150 | ACC | 100 | 378 | 489 | $9.0 \times 10^3$ | 18 |
| 28 | 12 | 1100 | ACC | 75 | 385 | 501 | $1.5 \times 10^4$ | 17 |
| 29 | 16 | 1150 | ACC | 80 | 399 | 489 | $1.2 \times 10^4$ | 13 |
| 30 | 9 | 1100 | DQT | 150 | 378 | 501 | $1.2 \times 10^4$ | 18 |
| 31 | 14 | 1050 | CR | 70 | 371 | 499 | $1.1 \times 10^4$ | 15 |

| STEEL No. | AMOUNT OF O IN WELDED METAL (mass %) | TOUGHNESS OF WELDED JOINT δc | | | $\delta_{WM}/\delta_{BM}$ | $\delta_{HAZ}/\delta_{BM}$ | REMARKS |
|---|---|---|---|---|---|---|---|
| | | [WM] LOWEST VALUE (mm) | [HAZ] LOWEST VALUE (mm) | [BM] LOWEST VALUE (mm) | | | |
| 1 | 0.0014 | 1.00 | 1.00 | 1.00 | 1.00 | 1.00 | EXAMPLE ACCORDING TO THE PRESENT INVENTION |
| 2 | 0.0017 | 0.80 | 0.95 | 0.99 | 0.81 | 0.96 | |
| 3 | 0.0014 | 1.00 | 0.90 | 1.00 | 1.00 | 0.90 | |
| 4 | 0.0011 | 0.88 | 0.88 | 1.00 | 0.88 | 0.88 | |
| 5 | 0.0019 | 0.86 | 1.00 | 1.00 | 0.86 | 1.00 | |
| 6 | 0.0019 | 0.80 | 1.00 | 0.99 | 0.81 | 1.01 | |
| 7 | 0.0012 | 0.90 | 1.00 | 1.00 | 0.90 | 1.00 | |
| 8 | 0.0009 | 0.77 | 0.98 | 0.95 | 0.81 | 1.03 | |
| 9 | 0.0018 | 0.86 | 0.88 | 1.00 | 0.86 | 0.88 | |
| 10 | 0.0011 | 0.90 | 0.97 | 1.00 | 0.90 | 0.97 | |
| 11 | 0.0019 | 0.75 | 1.00 | 1.00 | 0.75 | 1.00 | |
| 12 | 0.0012 | 0.88 | 1.00 | 0.99 | 0.89 | 1.01 | |

TABLE 3-continued

| | | | | | | |
|---|---|---|---|---|---|---|
| 13 | 0.0016 | 0.84 | 0.89 | 0.98 | 0.86 | 0.91 |
| 14 | 0.0015 | 0.69 | 1.00 | 1.00 | 0.69 | 1.00 |
| 15 | 0.0012 | 0.89 | 1.00 | 0.95 | 0.94 | 1.05 |
| 16 | 00012 | 0.78 | 0.98 | 1.00 | 0.78 | 0.98 |
| 17 | 0.0013 | 0.80 | 0.88 | 1.00 | 0.80 | 0.88 |
| 18 | 0.0015 | 0.74 | 0.97 | 1.00 | 0.74 | 0.97 |
| 19 | 0.0010 | 0.89 | 1.00 | 0.96 | 0.93 | 1.04 |
| 20 | 0.0009 | 0.83 | 1.00 | 1.00 | 0.83 | 1.00 |
| 21 | 0.0008 | 0.80 | 0.98 | 0.95 | 0.84 | 1.03 |
| 22 | 0.0013 | 0.68 | 0.88 | 1.00 | 0.68 | 0.88 |
| 23 | 0.0012 | 0.78 | 0.97 | 1.00 | 0.78 | 0.97 |
| 24 | 0.0008 | 0.85 | 1.00 | 1.00 | 0.85 | 1.00 |
| 25 | 0.0007 | 0.77 | 1.00 | 0.96 | 0.80 | 1.04 |
| 26 | 0.0009 | 0.76 | 0.98 | 1.00 | 0.76 | 0.98 |
| 27 | 0.0015 | 0.69 | 0.88 | 0.98 | 0.72 | 0.92 |
| 28 | 0.0013 | 0.74 | 0.97 | 1.00 | 0.74 | 0.97 |
| 29 | 0.0012 | 0.69 | 1.00 | 0.95 | 0.73 | 1.05 |
| 30 | 0.0013 | 0.65 | 1.00 | 1.00 | 0.65 | 1.00 |
| 31 | 0.0016 | 0.83 | 0.89 | 0.98 | 0.65 | 0.91 |

TABLE 4

| | MANUFACTURING CONDITION | | | PROPERTIES OF BASE METAL | | | |
|---|---|---|---|---|---|---|---|
| STEEL No. | COOLING RATE OF SLAB (°C./min) | HEATING TEMPERATURE OF STEEL PIECE (°C.) | THERMO-MECHANICAL TREATMENT | THICKNESS (mm) | YIELD STRENGTH (MPa) | TENSILE STRENGTH (MPa) | OXIDES HAVING Ti AND HAVING EQUIVALENT CIRCLE DIAMETER OF 0.05 μm TO 0.5 μm (PIECES/mm$^2$) | TOTAL NUMBER OF OXIDES HAVING EQUIVALENT CIRCLE DIAMETER OF 1.0 μm OR MORE (PIECES/mm$^2$) |
| 32 | 9 | 1050 | CR | 50 | 354 | 475 | 6.5 × 10$^3$ | 11 |
| 33 | 11 | 1100 | DQT | 120 | 399 | 503 | 7.9 × 10$^3$ | 9 |
| 34 | 14 | 1150 | ACC | 60 | 399 | 501 | 1.0 × 10$^4$ | 14 |
| 35 | 16 | 1100 | ACC | 60 | 331 | 456 | 5.6 × 10$^4$ | 13 |
| 36 | 10 | 1050 | ACC | 80 | 428 | 531 | 7.1 × 10$^3$ | 18 |
| 37 | 13 | 1100 | CR | 50 | 385 | 503 | 9.4 × 10$^3$ | 15 |
| 38 | 9 | 1100 | ACC | 55 | 399 | 501 | 1.3 × 10$^4$ | 19 |
| 39 | 10 | 1150 | ACC | 80 | 389 | 503 | 7.7 × 10$^3$ | 14 |
| 40 | 12 | 1100 | ACC | 90 | 378 | 501 | 8.6 × 10$^3$ | 17 |
| 41 | 16 | 1050 | ACC | 50 | 385 | 503 | 2.4 × 10$^3$ | 13 |
| 42 | 11 | 1100 | CR | 50 | 399 | 501 | 5.7 × 10$^4$ | 12 |
| 43 | 9 | 1100 | ACC | 55 | 378 | 491 | 9.6 × 10$^2$ | 6 |
| 44 | 10 | 1150 | ACC | 100 | 399 | 489 | 7.2 × 10$^5$ | 16 |
| 45 | 12 | 1100 | ACC | 60 | 400 | 503 | 8.6 × 10$^2$ | 4 |
| 46 | 12 | 1100 | ACC | 55 | 375 | 501 | 1.3 × 10$^5$ | 48 |
| 47 | 10 | 1100 | CR | 50 | 383 | 498 | 8.9 × 10$^3$ | 19 |
| 48 | 10 | 1050 | ACC | 50 | 386 | 511 | 7.2 × 10$^3$ | 13 |
| 49 | 12 | 1100 | CR | 50 | 403 | 517 | 1.3 × 10$^4$ | 17 |
| 50 | 12 | 1100 | DQT | 150 | 382 | 504 | 1.0 × 10$^4$ | 17 |
| 51 | 4 | 1150 | ACC | 100 | 378 | 489 | 6.8 × 10$^2$ | 36 |

| STEEL No. | AMOUNT OF O IN WELDED METAL (mass %) | TOUGHNESS OF WELDED JOINT δc | | | $\delta_{WM}/\delta_{BM}$ | $\delta_{HAZ}/\delta_{BM}$ | REMARKS |
|---|---|---|---|---|---|---|---|
| | | [WM] LOWEST VALUE (mm) | [HAZ] LOWEST VALUE (mm) | [BM] LOWEST VALUE (mm) | | | |
| 32 | 0.0019 | 0.15 | 0.23 | 0.95 | 0.16 | 0.24 | CONVENTIONAL EXAMPLE |
| 33 | 0.0012 | 0.23 | 0.31 | 1.00 | 0.23 | 0.31 | |
| 34 | 0.0013 | 0.52 | 0.22 | 1.00 | 0.52 | 0.22 | |
| 35 | 0.0007 | 0.13 | 0.88 | 1.00 | 0.13 | 0.88 | |
| 36 | 0.0014 | 0.48 | 0.13 | 0.96 | 0.50 | 0.14 | |
| 37 | 0.0012 | 0.08 | 0.21 | 0.99 | 0.08 | 0.21 | |
| 38 | 0.0015 | 0.03 | 0.14 | 0.96 | 0.03 | 0.15 | |
| 39 | 0.0012 | 0.09 | 0.07 | 1.00 | 0.09 | 0.07 | |
| 40 | 0.0010 | 0.22 | 0.23 | 1.00 | 0.22 | 0.23 | |
| 41 | 0.0013 | 0.19 | 0.23 | 1.00 | 0.19 | 0.23 | |
| 42 | 0.0016 | 0.14 | 0.24 | 0.96 | 0.15 | 0.25 | |
| 43 | 0.0016 | 0.21 | 0.24 | 1.00 | 0.21 | 0.24 | |
| 44 | 0.0014 | 0.15 | 0.23 | 1.00 | 0.15 | 0.23 | |
| 45 | 0.0004 | 0.05 | 0.05 | 1.00 | 0.05 | 0.05 | |
| 46 | 0.0033 | 0.11 | 0.06 | 1.00 | 0.11 | 0.06 | |
| 47 | 0.0013 | 0.08 | 0.52 | 1.00 | 0.08 | 0.52 | |
| 48 | 0.0011 | 0.12 | 0.51 | 1.00 | 0.12 | 0.51 | |

TABLE 4-continued

| | | | | | | |
|---|---|---|---|---|---|---|
| 49 | 0.0009 | 0.51 | 0.24 | 0.96 | 0.53 | 0.25 |
| 50 | 0.0014 | 0.65 | 0.22 | 1.00 | 0.65 | 0.22 |
| 51 | 0.0014 | 0.68 | 0.12 | 0.99 | 0.69 | 0.12 |

The invention claimed is:

1. An electron-beam welded joint obtained by applying an electron-beam welding to a steel, the steel comprising as a composition, by mass %,
C: 0.02% to 0.10%,
Si: 0.03% to 0.30%,
Mn: 1.5% to 2.5%,
Ti: 0.005% to 0.015%,
N: 0.0020% to 0.0060%,
O: 0.0010% to 0.0035%
Nb: 0% to 0.020%,
V: 0% to 0.030%,
Cr: 0% to 0.50%,
Mo: 0% to 0.50%,
Cu: 0% to 0.25%,
Ni: 0% to 0.50%,
B: 0% to 0.0030%,
S: limited to 0.010% or less,
P: limited to 0.015% or less,
Al: limited to 0.004% or less, and
a balance consisting of iron and unavoidable impurities, wherein
an index value CeEB defined by a following Formula 1 is 0.49% to 0.60%,
a C/CeEB, which is a ratio of an amount in mass % of C in the steel relative to the index value CeEB of the steel, is 0.04 to 0.18,
a number of oxides having an equivalent circle diameter of 1.0 μm or more is 20 pieces/mm² or less at a thickness center portion in a cross-section along a thickness direction of the steel, and
a number of oxides containing Ti of 10% or more and having an equivalent circle diameter of 0.05 μm or more and less than 0.5 μm is 1×10³ pieces/mm² to 1×10⁵ pieces/mm² at the thickness center portion, the index value of hardenability after the electron-beam welding, CeEB=C+(9/40)Mn+(1/15)Cu+(1/15)Ni+(1/5)Cr+(1/5)Mo+(1/5)V  (Formula I)

where C, Mn, Cu, Ni, Cr, Mo and V represent amounts in mass % of each element contained in the composition of the steel.

2. The electron-beam welded joint according to claim 1, wherein the steel has a thickness of 45 to 150 mm.

3. The electron-beam welded joint according to claim 1, wherein, when a CTOD value of a welded metal is defined as $\delta_{WM}$, a CTOD value of a weld heat-affected zone is defined as $\delta_{HAZ}$, and a CTOD value of the steel is defined as $\delta_{BM}$, $0.5 \leq \delta_{WM}/\delta_{BM} \leq 1.1$, and $0.5 \leq \delta_{HAZ}/\delta_{BM} \leq 1.1$ are satisfied.

4. A steel for an electron-beam welding, the steel comprising as a composition, by mass %,
C: 0.02% to 0.10%,
Si: 0.03% to 0.30%,
Mn: 1.5% to 2.5%,
Ti: 0.005% to 0.015%,
N: 0.0020% to 0.0060%,
O: 0.0010% to 0.0035%,
Nb: 0% to 0.020%,
V: 0% to 0.030%,
Cr: 0% to 0.50%,
Mo: 0% to 0.50%,
Cu: 0% to 0.25%,
Ni: 0% to 0.50%,
B: 0% to 0.0030%,
S: limited to 0.010% or less,
P: limited to 0.015% or less,
Al: limited to 0.004% or less, and
a balance consisting of iron and unavoidable impurities, wherein
an index value CeEB obtained by substituting the composition of the steel into a following Formula I is 0.49% to 0.60%,
a C/CeEB, which is a ratio of an amount in mass % of C in the steel relative to the index value CeEB of the steel, is 0.04 to 0.18,
a number of oxides having an equivalent circle diameter of 1.0 μm or more is 20 pieces/mm² or less at a thickness center portion in a cross-section along a thickness direction of the steel, and
a number of oxides containing Ti of 10% or more and having an equivalent circle diameter of 0.05 μm or more and less than 0.5 μm is 1×10³ pieces/mm² to 1×10⁵ pieces/mm² at the thickness center portion, the index value of hardenability after electron-beam welding, CeEB=C+(9/40)Mn+(1/15)Cu+(1/15)Ni+(1/5)Cr+(1/5)Mo+(1/5)V  (Formula I)

where C, Mn, Cu, Ni, Cr, Mo, and V represent amounts in mass % of each element contained in the composition of the steel.

5. The steel for the electron-beam welding according to claim 4, wherein the steel has a thickness of 45 to 150 mm.

6. A method of manufacturing the steel for the electron-beam welding according to claim 4, the method comprising,
a casting process of casting and cooling the steel so that a cooling rate in a temperature range of 1300° C. to 1100° C. is 9° C./min or more, and
a process of heating the steel to a temperature range of 950° C. to 1150° C. after the casting process, and thereafter thermomechanical-treating the steel.

7. A method of manufacturing the steel for the electron-beam welding according to claim 5, the method comprising,
a casting process of casting and cooling the steel so that a cooling rate in a temperature range of 1300° C. to 1100° C. is 9° C./min or more, and
a process of heating the steel to a temperature range of 950° C. to 1150° C. after the casting process, and thereafter thermomechanical-treating the steel.

* * * * *